US010514965B2

(12) United States Patent
Lee et al.

(10) Patent No.: US 10,514,965 B2
(45) Date of Patent: Dec. 24, 2019

(54) NAVIGATING BETWEEN APPLICATIONS OF A DEVICE

(71) Applicant: Verizon New Jersey Inc., Newark, NJ (US)

(72) Inventors: Woo Beum Lee, Basking Ridge, NJ (US); Jeffrey M Walsh, Verona, NJ (US)

(73) Assignee: VERIZON NEW JERSEY INC., Newark, NJ (US)

( * ) Notice: Subject to any disclaimer, the term of this patent is extended or adjusted under 35 U.S.C. 154(b) by 509 days.

(21) Appl. No.: 13/913,003

(22) Filed: Jun. 7, 2013

(65) Prior Publication Data

US 2014/0365962 A1     Dec. 11, 2014

(51) Int. Cl.
   *G06F 3/0482*     (2013.01)
   *G06F 9/54*       (2006.01)

(52) U.S. Cl.
   CPC .................................. *G06F 9/542* (2013.01)

(58) Field of Classification Search
   CPC ............................. G06F 3/0482; G06F 3/0481
   USPC ........................................................ 715/810
   See application file for complete search history.

(56) References Cited

U.S. PATENT DOCUMENTS

| 8,612,470 | B1* | 12/2013 | Fushman | ........ | G06F 17/30174 |
| | | | | | 707/749 |
| 2004/0201614 | A1* | 10/2004 | Genty et al. | ........ | 345/738 |
| 2010/0062811 | A1* | 3/2010 | Park | ........ | G06F 3/0482 |
| | | | | | 455/566 |
| 2010/0222033 | A1* | 9/2010 | Scott | ........ | H04M 3/5322 |
| | | | | | 455/414.1 |
| 2011/0106892 | A1* | 5/2011 | Nelson et al. | ........ | 709/206 |
| 2011/0130958 | A1* | 6/2011 | Stahl | ........ | G01C 21/362 |
| | | | | | 701/533 |
| 2011/0138328 | A1* | 6/2011 | Ge | ........ | G06F 3/0482 |
| | | | | | 715/811 |
| 2011/0167339 | A1* | 7/2011 | Lemay | ........ | 715/255 |
| 2012/0094719 | A1* | 4/2012 | Choi | ........ | H04M 1/72566 |
| | | | | | 455/566 |
| 2012/0164971 | A1* | 6/2012 | Choi | ........ | H04M 1/72566 |
| | | | | | 455/405 |
| 2012/0236025 | A1* | 9/2012 | Jacobsen et al. | ........ | 345/629 |
| 2013/0111395 | A1* | 5/2013 | Ying | ........ | G06F 3/0483 |
| | | | | | 715/783 |
| 2013/0159941 | A1* | 6/2013 | Langlois | ........ | G06F 3/017 |
| | | | | | 715/863 |
| 2013/0198506 | A1* | 8/2013 | Smith | ........ | G06F 1/1684 |
| | | | | | 713/100 |

(Continued)

*Primary Examiner* — Ryan F Pitaro
*Assistant Examiner* — Pritisha N Parbadia

(57) ABSTRACT

A device may detect an event during execution of a particular application of the device. As part of detecting the event, the device may detect a closing of the particular application or may detect a calendar event. The device may identify a sequence of applications related to the event based on information identifying the event and may present graphical information identifying the sequence of applications. The device may detect selection of graphical information identifying another application from the graphical information identifying the sequence of applications, and may initiate the other application based on detecting the selection of the graphical information identifying the other application.

20 Claims, 17 Drawing Sheets

(56) References Cited

U.S. PATENT DOCUMENTS

| | | | |
|---|---|---|---|
| 2013/0247055 A1* | 9/2013 | Berner | G06Q 10/00 718/102 |
| 2013/0253928 A1* | 9/2013 | Bringert | G06F 3/167 704/235 |
| 2013/0339901 A1* | 12/2013 | Kirkham | H04M 1/72586 715/810 |
| 2014/0068494 A1* | 3/2014 | Petersen | H04M 1/7253 715/778 |
| 2014/0157209 A1* | 6/2014 | Dalal | G06F 3/017 715/863 |
| 2014/0195972 A1* | 7/2014 | Lee | G06F 3/04817 715/811 |
| 2014/0237426 A1* | 8/2014 | Terazono | G06F 3/04817 715/810 |
| 2014/0282240 A1* | 9/2014 | Flynn, III | G06F 3/0488 715/810 |

* cited by examiner

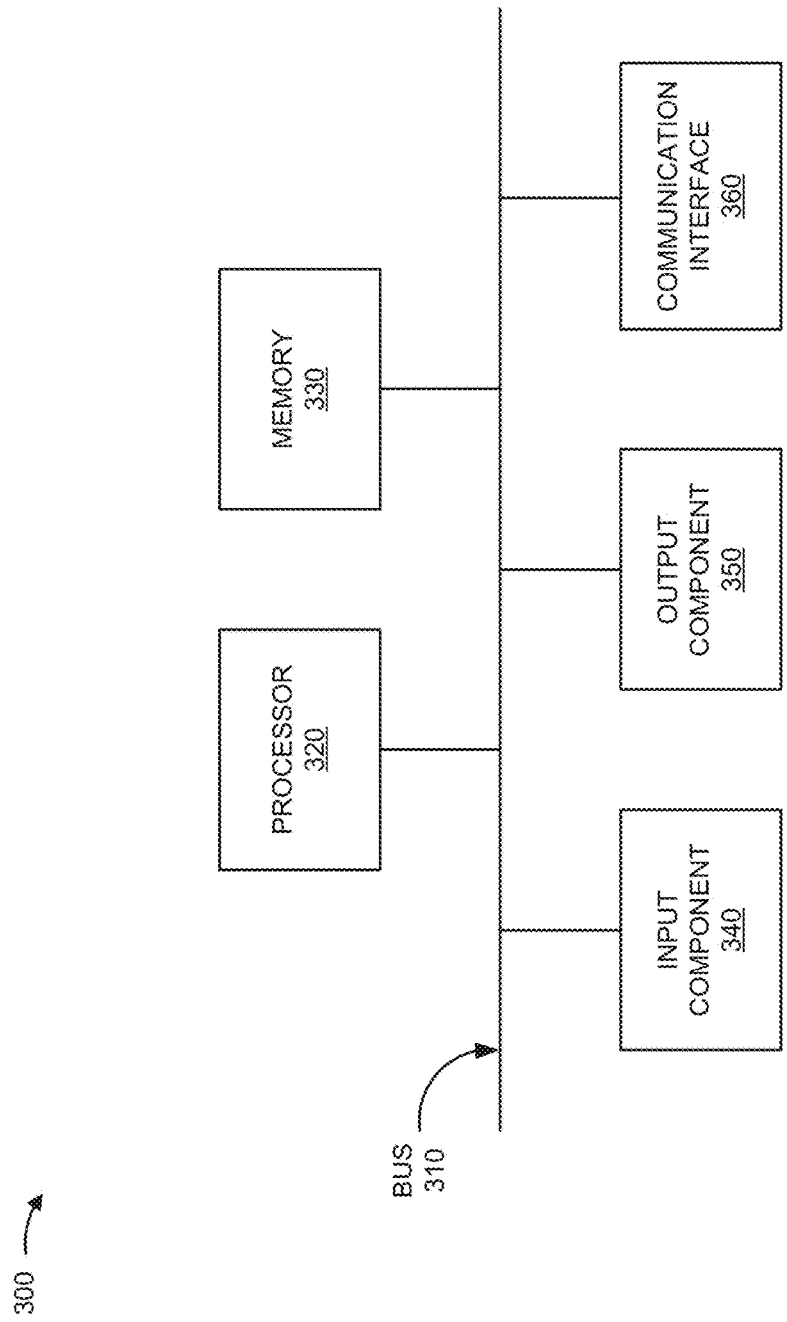

| APPLICATION IDENTIFICATION 405 | APPLICATION DECRIPTION 410 | APPLICATION CATEGORY IDENTIFICATION 415 | APPLICATION CATEGORY DECRIPTION 420 |
| --- | --- | --- | --- |
| 1 | NEWS APPLICATION | 1 | NEWS |
| 2 | SPORTS APPLICATION | 2 | SPORTS |
| 3 | PRO BASKETBALL APPLICATION | 2 | SPORTS |
| ... | ... | ... | ... |

| SEQUENCE IDENTIFICATION 425 | SEQUENCE DESCRIPTION 430 |
|---|---|
| 1 | APPLICATION ID 1, APPLICATION ID 2, APPLICATION ID 3 |
| 2 | APPLICATION ID 3, APPLICATION ID 1 |
| ... | ... |

| EVENT IDENTIFICATION 435 | EVENT DESCRIPTION 440 | ACTION 445 |
|---|---|---|
| 1 | CLOSING APPLICATION ID 2 | PROVIDE SEQUENCE ID 1 |
| 2 | 7:15AM MON-FRI | INITIATE APPLICATION ID 1 |
| 3 | SPORTS NOTIFICATION | PROVIDE APPLICATIONS OF APPLICATION CATEGORY ID 2 |
| ••• | ••• | ••• |

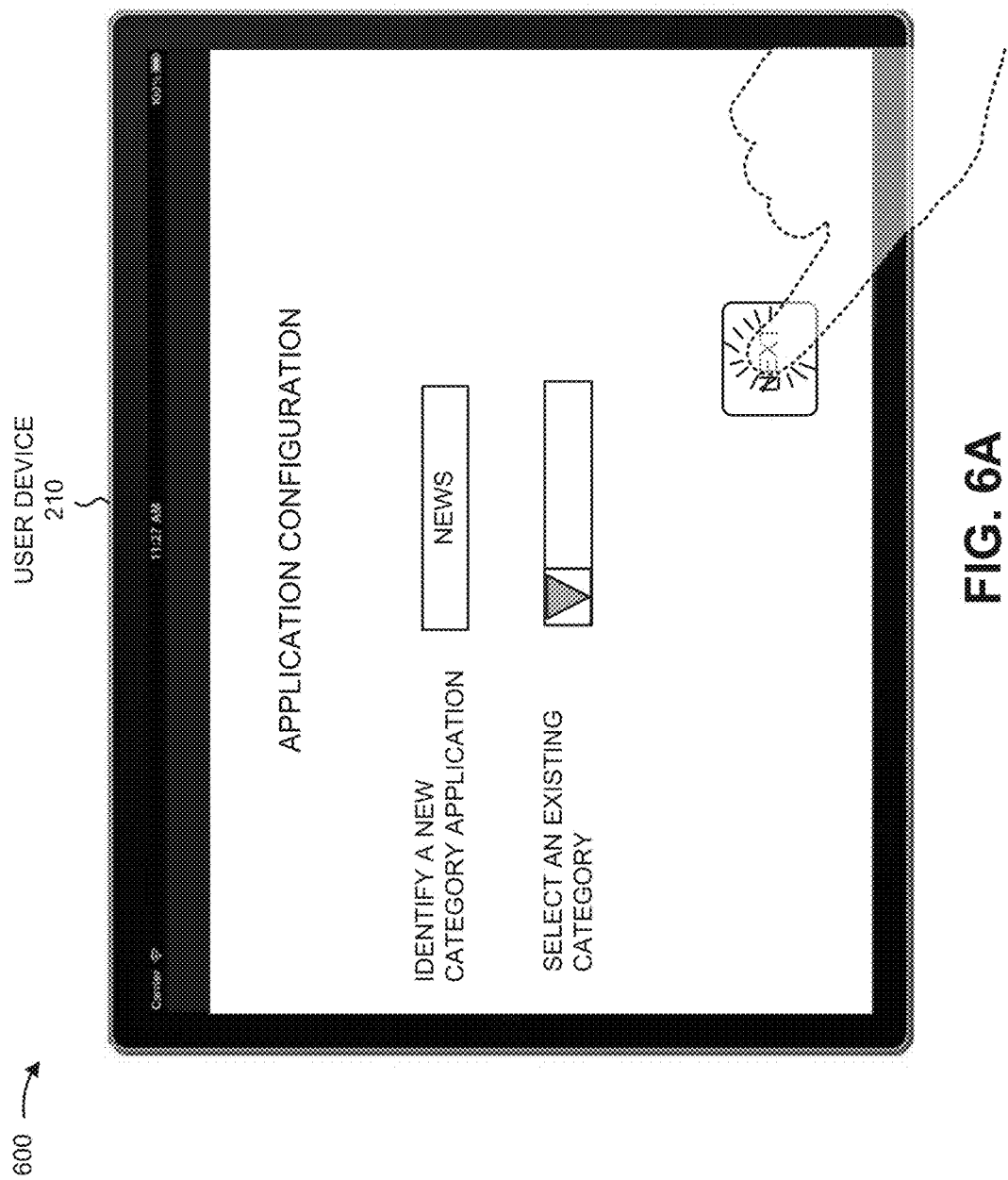

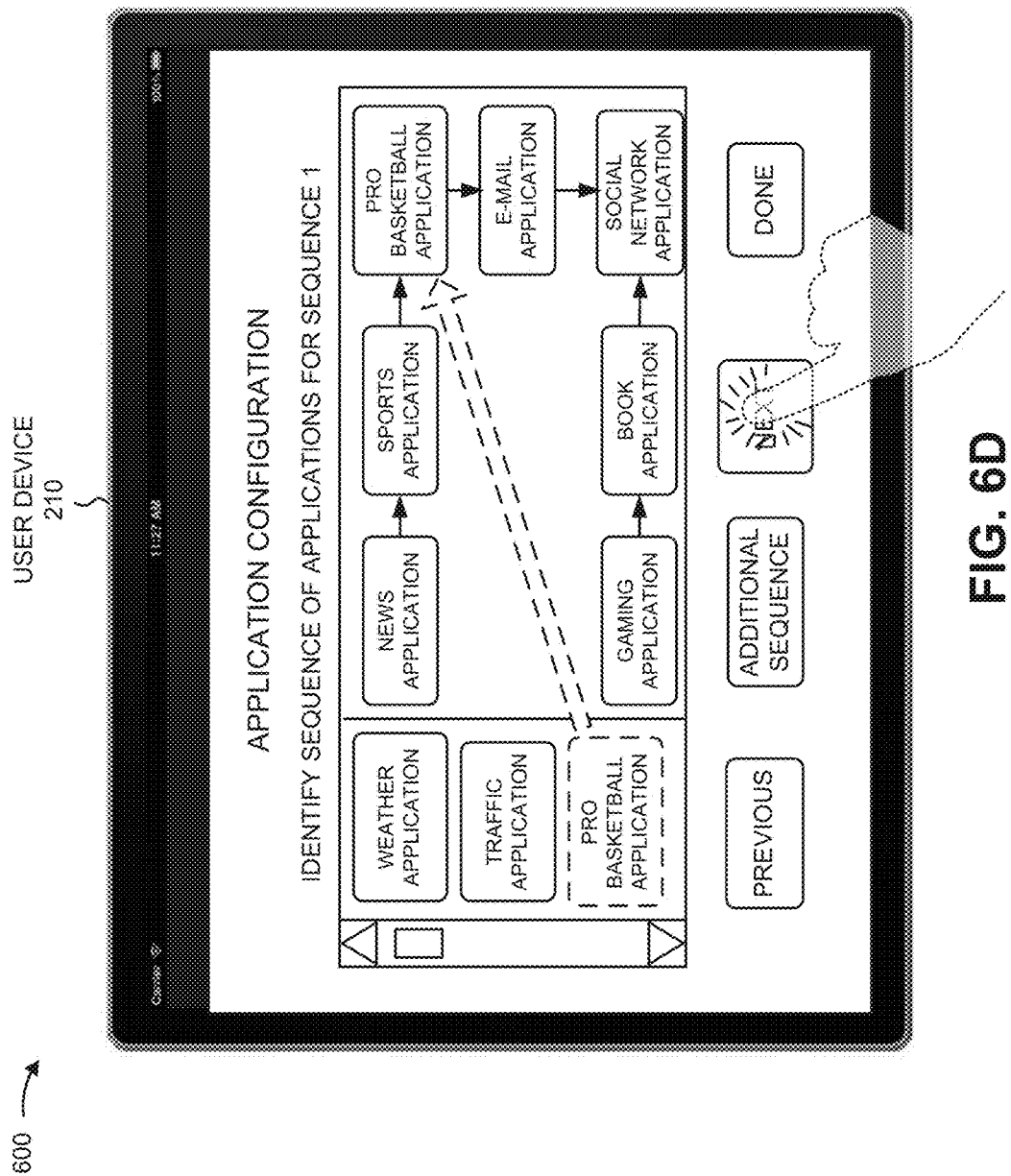

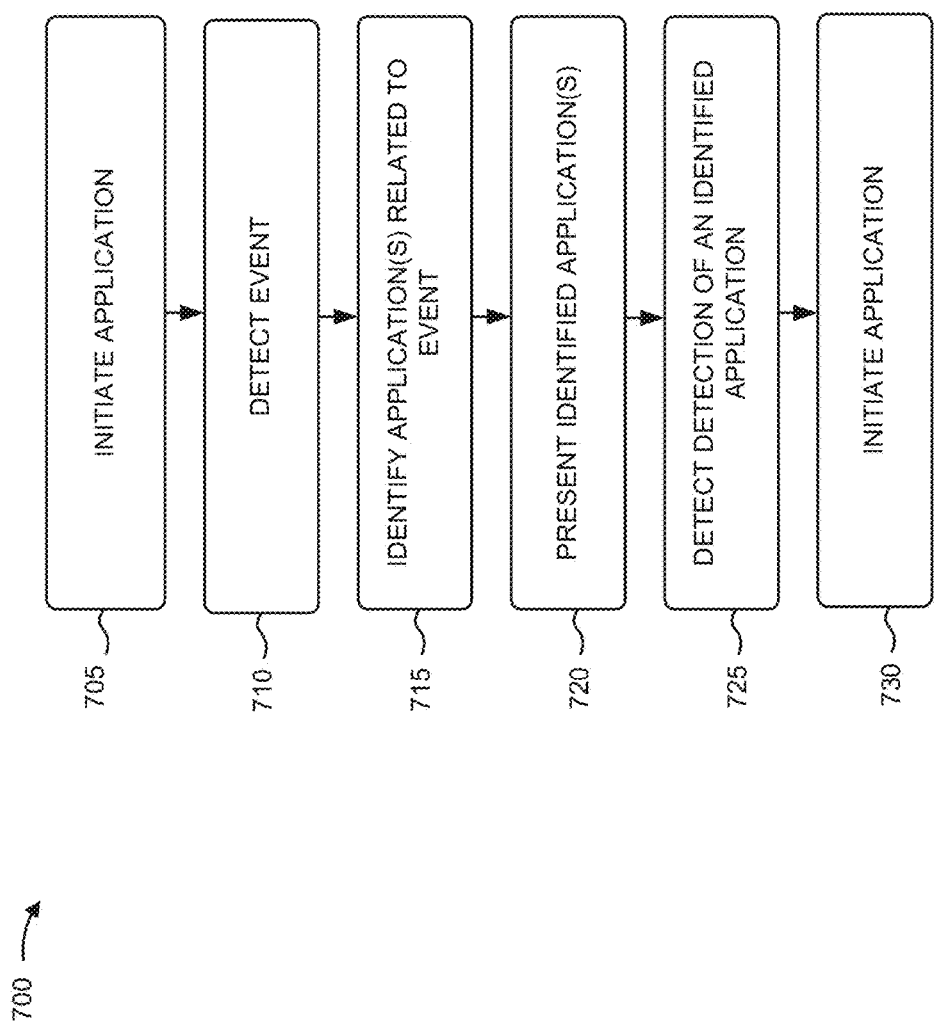

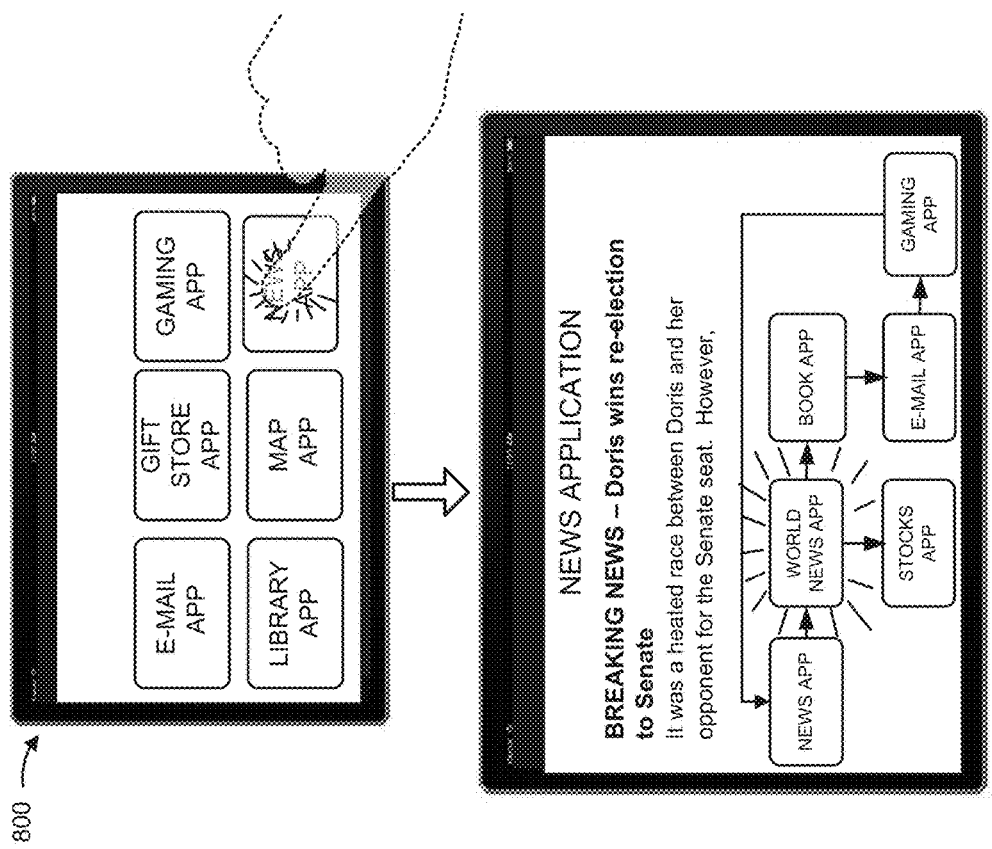

NAVIGATING BETWEEN APPLICATIONS OF A DEVICE

BACKGROUND

A user device may include multiple applications. A user of the user device may navigate between the applications at different times and for different purposes. However, navigating between the applications may require multiple actions by the user. These multiple actions may negatively affect user experience.

BRIEF DESCRIPTION OF DRAWINGS

FIG. 3 is a diagram of example components of one or more devices of FIG. 2;

FIGS. 4A-4C are diagrams of example data structures;

FIGS. 6A-6E are diagrams of an example of the process described in FIG. 5;

FIG. 7 is a flow chart of an example process for navigating between applications; and FIG. 8A-8D are diagrams of an example of the process described in FIG. 7.

DETAILED DESCRIPTION OF PREFERRED EMBODIMENTS

The following detailed description refers to the accompanying drawings. The same reference numbers in different drawings may identify the same or similar elements.

Systems and/or methods described herein may enable a user device to identify applications, based on a detected event, and suggest the identified applications to a user of the user device thereby facilitating the switching between applications of the user device with ease.

Figure 1:
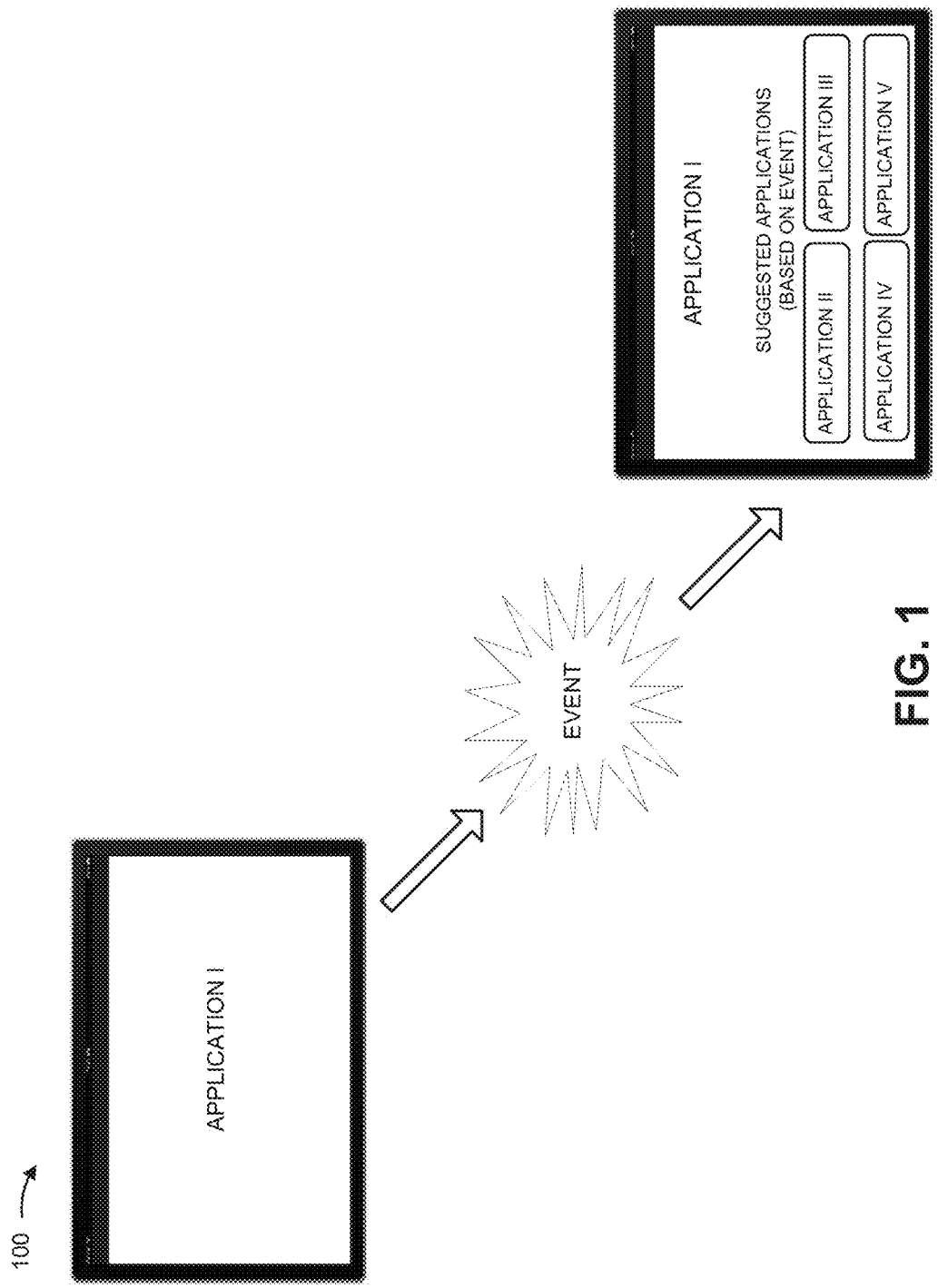
FIG. 1 is a diagram of an overview of an implementation described herein.

FIG. 1 is a diagram of an overview of an implementation described herein. In FIG. 1, assume, for example, that a user is using an application (identified as APPLICATION I) of a user device (displayed as a tablet computer). Assume that an event has occurred at the user device. The event may include, for example, a closing of the application, a calendar reminder, a gesture on a touch screen display of the user device, or a command (e.g., a voice command). Further assume that the user has downloaded, onto the user device, a particular application that enables the user device to suggest applications to the user based on events occurring at the user device and assume that the particular application has detected the event. Thus, the particular application may enable the user device to identify other applications that are related to the event and may enable the user device to suggest the identified applications to the user.

In some implementations, the applications may be provided to the user as a sequence (e.g., an order) of applications that identifies applications that are typically used by the user prior to and/or after the user uses the application. In some implementations, the applications may be provided to the user in an order of relevancy to the event, an order of frequency of use, an order of recency of use, etc. In some implementations, the applications may be identified based on information associated with the event. For example, the information associated with the event may include keywords associated with the event, a date and/or a time associated with the event, and/or the like. Accordingly, applications that are related to the event may be identified based on the keywords and/or based on the date and/or the time associated with the event. In some instances, the user may associate the applications with the information associated with the event.

In some implementations, the applications may be identified based on information associated with the event and information associated with the application being used by the user. For example, the event may include an action of the user indicative of the user closing the application. Accordingly, applications, that are typically used by the user prior to and/or after the user using the application, may be identified. The applications may be part of a sequence of applications that are typically used by the user prior to and/or after the user using the application. In some implementations, the sequence may be identified by the user and the user may cause the sequence to be associated with the event. In some implementations, the particular application may monitor the user's usage of applications to automatically identify the sequence of applications and may suggest the sequence of applications to the user based on monitoring the user's usage of applications.

Accordingly, systems and methods, as described herein, may minimize user actions required to navigate between applications and, therefore, may facilitate navigating between applications.

As explained above, systems and methods, as described herein, may monitor the user's usage of applications and suggest applications to a user based on monitoring the user's usage of application. To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Figure 2:
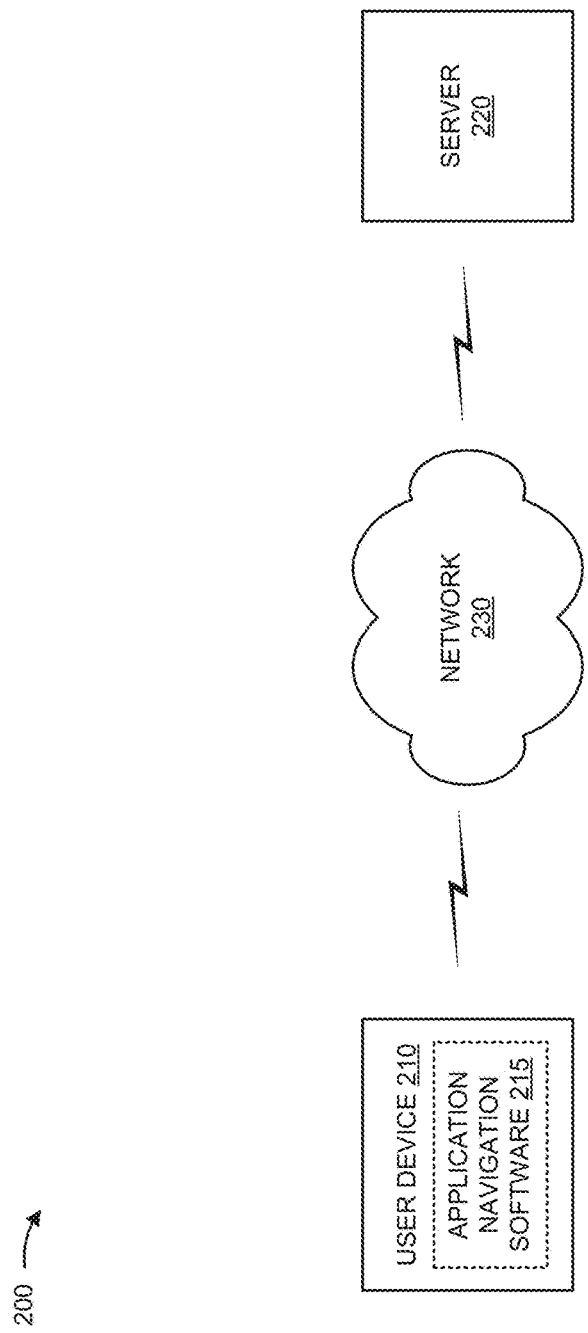
FIG. 2 is a diagram of an example environment in which systems and/or methods described herein may be implemented.

FIG. 2 is a diagram of an example environment 200 in which systems and/or methods described herein may be implemented. Environment 200 may include a user device 210, a server 220, and a network 230.

User device 210 may include one or more devices that are capable of facilitating navigation between applications. For example, user device 210 may include a personal digital assistant (PDA) (e.g., that include a radio telephone, a pager, Internet/intranet access, etc.), a tablet computer, a smart phone, a laptop, a gaming device, and/or a personal computer. In some implementations, user device 210 may include application navigation software 215. For example, user device 210 may obtain application navigation software 215 or may be preloaded with application navigation software 215. User device 210 may be configured, using application navigation software 215, to suggest one or more other applications to the user based on an event detected by user device 210 thereby facilitating navigation between applications.

Server 220 may include one or more server devices. In some implementations, server 220 may transmit application navigation software 215 to user device 210.

Network 230 may include one or more wired and/or wireless networks. For example, network 230 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, and/or a combination of these or other types of networks. Additionally, or alternatively, network 230 may include a high-definition multimedia interface ("HDMI") connection, a digital visual interface ("DVI") connection, a universal serial bus ("USB") connection, or a similar connection.

The quantity of devices and/or networks, illustrated in FIG. 2, is provided for explanatory purposes only. In some implementations, there may be additional devices and/or networks; fewer devices and/or networks; different devices and/or networks; or differently arranged devices and/or networks than illustrated in FIG. 2. For example, environment 200 may include multiple user devices 210 all associated with one user. In such instance, the user may configure application navigation software 215, on one user device 210, to obtain configuration information of application navigation software 215 and the configuration information may be transmitted, via network 230, to one or more other user device 210, of the user, to configure application navigation software 215 on the one or more other user device 210. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

FIG. 3 is a diagram of example components of a device 300. Device 300 may correspond to user device 210 and/or server 220. Additionally, or alternatively, each of user device 210 and/or server 220 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array ("FPGA"), an application-specific integrated circuit ("ASIC"), etc.) that interprets and/or executes instructions. Memory 330 may include a random access memory ("RAM"), a read only memory ("ROM"), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a camera, a microphone, a switch, etc.). Output component 350 may include a component that outputs information from device 300 (e.g., a display, an audio speaker, one or more light-emitting diodes ("LEDs"), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency ("RF") interface, a universal serial bus ("USB") interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

FIGS. 4A-4C are example data structures 400A, 400B, and 400C that store information that may be used to suggest applications based on a detected event and, thereby, facilitate navigation between applications of user device 210. In some implementations, user device 210 may store a portion of or an entirety of data structure 400A, data structure 400B, and/or data structure 400C. In some implementations, data structure 400A, data structure 400B, and/or data structure 400C may be stored in memory, associated with another device or a group of devices, separate from, or in combination, with memory associated with user device 210.

In some implementations, data structure 400A, data structure 400B, and data structure 400C may be associated with a user of user device 210. In some implementations, user device 210 may be associated with a group of users. Accordingly, user device 210 may store, in association with each user of the group of users, different data structures similar to data structure 400A, data structure 400B, and data structure 400C.

As shown in FIG. 4A, data structure 400A may include a group of fields, such as, for example, application identification field 405, application description field 410, application category identification field 415, and application category description field 420.

Application identification field 405 may store information that uniquely identifies an application. For example, the information may include one or more characters that uniquely identify the application.

Application description field 410 may store information that describes an application. The information may include a name of the application, metadata of the application, and/or other information that describes the application.

Application category identification field 415 may store information that uniquely identifies a category of an application. The information may include one or more characters that uniquely identify the category.

Application category description field 420 may store information that describes a category of an application. The information may include a name of the category. For example, the name of the category of an application may include sports related application, news related application, travel related application, eatery related application, gift related application, education related application, gaming related application, children related application, and/or the like. For example, as shown in FIG. 4A, News application is associated with the News category and Sports application and Pro Basketball application is associated with the Sports category.

As shown in FIG. 4B, data structure 400B may include a group of fields, such as, for example, sequence identification field 425 and sequence description field 430.

Sequence identification field 425 may store information that uniquely identifies a sequence of applications. The information may include one or more characters that uniquely identify the sequence of applications. For example, sequence identification field 425 may include a name of the sequence such as morning applications sequence, game applications sequence, evening application sequences, etc.

Sequence description field 430 may store information that identifies applications and a sequence of the applications. The information that identifies the applications may include identifiers of the applications and/or names of the applications. The identifiers of the applications and/or names of the applications may be identified in a sequence. For example, as shown in FIG. 4B, Sequence 1 includes Application ID 1, Application ID 2, and Application ID 3 which indicates that Application ID 1 is followed by Application ID 2, which is followed by Application ID 3. Additionally, or alternatively, the information that identifies the applications may include information identify one or more categories of applications.

As shown in FIG. 4C, data structure 400C may include a group of fields, such as, for example, event identification field 435, event description field 440, and action field 445.

Event identification field 435 may store information that uniquely identifies an event. The information that uniquely identifies the event may include one or more characters that uniquely identify the event.

Event description field 440 may store information that describes an event. For example, event description field 420 may store information identifying a description of an event as a closing of (or anticipating a closing of) an application (e.g., an application closing event), a calendar event (e.g., a reminder for a calendar event), receiving a notification (e.g., a push notification), a gesture on a display of user device 210 (e.g., touch screen display), a command, and/or the like. A notification may include, for example, an e-mail, a text message, a notification associated with a social network, a message from an entity associated with an application of user device 210, and/or the like.

With respect to an application closing event, event description field 420 may store information that uniquely identifies the application such as, for example, an identifier of the application and/or a name of the application. With respect to a calendar event, event description field 420 may store information identifying the calendar event such as, for example, a date associated with the calendar event, a time associated with the calendar event, a title of the calendar event, a location associated with the calendar event, one or more individuals associated with the calendar event, and/or the like. With respect to a notification, event description field 420 may store information identifying a source of the notification (e.g., information identifying a device or a user sending the notification), content of the notification, and/or the like. For example, as shown in FIG. 4C, the closing of Application ID 3 may cause Sequence ID 1 to be provided. As also shown in FIG. 4C, for example, Application ID 1 may be initiated Monday to Friday at 7:15 AM. Additionally, the sequence of applications that includes Application ID 1 may be provided during execution of Application ID 1. As additionally shown in FIG. 4C, for example, applications of application Category ID 2 (i.e., Sports category) may be provided when a Sports notification is received.

Action field 445 may store information that identifies an action to be taken based on an event that is detected. The information that identifies the action to be taken may include identifying one or more applications related to the event and suggesting the one or more applications to a user of user device 210. Alternatively, or additionally, the information that identifies the action to be taken may include identifying a sequence of applications related to the event and suggesting the sequence of applications to the user. Alternatively, or additionally, the information that identifies the action to be taken may include initiating an application related to the event. Alternatively, or additionally, the information that identifies the action to be taken may include initiating an application related to the event and suggesting a sequence of applications that includes the application. Alternatively, or additionally, the information that identifies the action to be taken may include navigating from one application, in a sequence of application, to another application in the sequence of application. Alternatively, or additionally, the information that identifies the action to be taken may include identifying one or more categories of applications that are related to the event, identifying one or more applications that are associated with the one or more categories of applications, and suggesting the one or more applications to the user.

In some implementations, all or a portion of the information stored in data structures 400A-400C may be input by a user of user device 210. In some implementations, all or a portion of the information stored in data structures 400A-400C may be stored without user input. For example, application navigation software 215 may cause all or a portion of the information stored in data structures 400A-400C to be stored, without user input, based on, for example, application navigation software 215 monitoring the user's usage of applications.

While FIGS. 4A-4C show example fields of data structures 400A-400C, in some implementations, data structures 400A-400C may include different fields, additional fields, few fields, or differently arranged fields than the example fields depicted in FIGS. 4A-4C.

Figure 5:
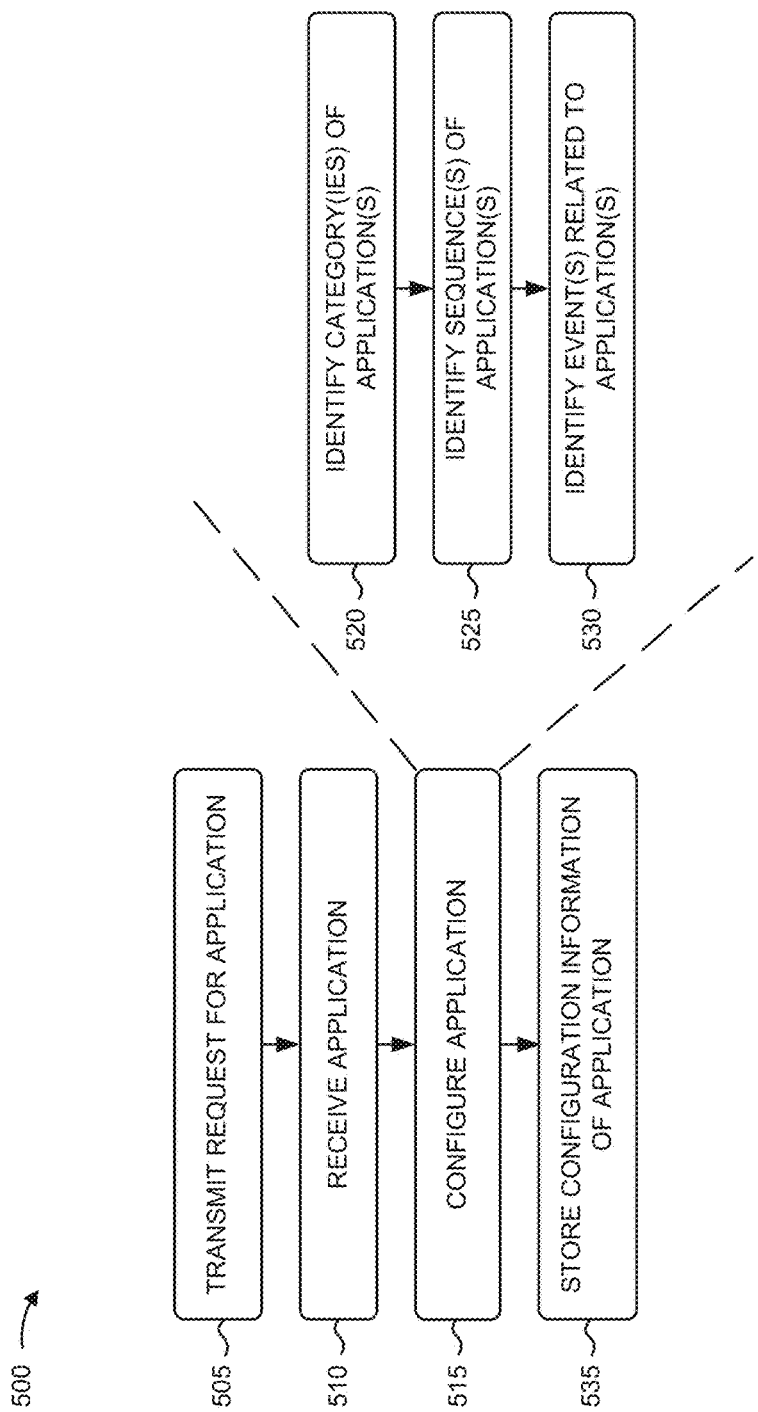
FIG. 5 is a flow chart of an example process for configuring a user device.

FIG. 5 is a flowchart of an example process 500 for configuring a user device to suggest one or more applications to the user based on an event detected by the user device. In some implementations, process 500 may be performed by user device 210. In some implementations, one or more blocks of process 500 may be performed by one or more devices instead of, or possibly in conjunction with, user device 210.

Process 500 may include transmitting a request for an application that may enable a user device to suggest one or more applications to the user, based on an event detected by the user device (block 505). For example, a user may cause user device 210 to access a user interface that provides information regarding applications that may be obtained. In some implementations, the user may cause user device 210 to access an application store, which provides information regarding applications (including application navigation software 215) that may be obtained. In some implementations, the user may cause user device 210 to access the application store via, for example, a user interface (such as a browser) or in another manner. The user may then select, using user device 210, information regarding application navigation software 215 from the information regarding the applications to cause user device 210 to transmit a request for application navigation software 215.

Process 500 may include receiving the application (block 510). For example, user device 210 may receive application navigation software 215 and store application navigation software 215 in a memory associated with user device 210.

Process 500 may include configuring the application (block 515). For example, a user may initiate application navigation software 215 and configure application navigation software 215 to generate configuration information. In some implementations, configuring application navigation software 215 may include, for example, identifying categories of applications, identifying sequences of applications, and identifying events related to applications.

In some implementations, the user may submit information to configure application navigation software 215 using one or more elements of one or more user interfaces provided by user device 210. The one or more elements may include, for example, one or more text input elements, one or more drop down menu elements, one or more checkbox elements, one or more radio button elements, and/or any other types of elements that may be used to receive the information from the user. In some implementations, the configuration of application navigation software 215 may be performed automatically (i.e., without user intervention) by application navigation software 215 based on monitoring the user's usage of applications. For example, application navigation software 215 may generate application usage information, based on monitoring the user's usage of applications, and use that application usage information to automatically configure application navigation software 215. By way of example, the application usage information may include information identifying a frequency of usage of applications, a recency of usage of applications, typical sequence(s) of usage of application(s), event(s) and application(s) associated with the event(s), an amount of time (e.g., average amount of time) spent accessing each application, and/or the like. The application usage information may be stored in a memory associated user device 210.

In some implementations, application navigation software 215 may provide, to a user of user device 210, suggestions relating to the configuration of application navigation software 215 and may implement each of the suggestions only after the user approves each of the suggestions. In some implementations, the user may authorize application navigation software 215 to implement the suggestions without an explicit authorization, from the user, for each of the suggestions.

In some implementations, the configuration of application navigation software 215 and/or the suggestions relating to the configuration of application navigation software 215 may be repeated. In some implementations, the frequency of repeating the configuration of application navigation software 215 and/or the suggestions relating to the configuration of application navigation software 215 may be configurable by the user. For example, the user may provide instructions that the configuration of application navigation software 215 occur weekly, biweekly, monthly, quarterly, etc. Additionally, or alternatively, the user may provide instructions that the configuration of application navigation software 215 occur each time a new application is downloaded to user device 215, each time an application is removed from user device 215, and/or the like. In some implementations, application navigation software 215 may identify (and suggest to the user) the frequency of repeating the configuration of application navigation software 215 based on, for example, monitoring the user's usage of applications and/or the user's frequency of downloading new applications.

Process 500 may include, as part of configuring the application, identifying categories of applications (block 520). For example, information identifying one or more categories of applications may be identified, and information identifying one or more applications, of user device 210, may be identified and associated with the information identifying a respective category of applications. The information identifying the one or more categories and the information identifying the one or more applications may be stored in a data structure such as, for example, data structure 400A.

In some implementations, the user may provide the information identifying the one or more categories and provide the information identifying the one or more applications that are associated with each category using the one or more elements of the one or more user interfaces provided by user device 210. For example, the user may provide a name of a category of applications and cause one or more applications to be associated with the category of application. In some implementations, the user may delete one or more categories of applications, associate one or more additional applications with one or more categories of applications, disassociate one or more applications from one or more categories of applications, and/or associate the one or more applications with other one or more categories of applications.

In some implementations, application navigation software 215 may automatically perform all or a portion of the acts described above with respect to identifying the categories of applications. For example, application navigation software 215 may identify a particular application to be associated with a particular category of application based on data (e.g., metadata and/or name the particular application) of the particular application and information identifying the particular category of application (e.g., name of the particular category). Application navigation software 215 may then suggest, to the user of user device 210, that the particular application be associated with the particular category of application, and may cause information identifying the particular application to be stored in a data structure such as data structure 400A, in association with the information identifying the particular category of application when the user accepts the suggestion.

Process 500 may include, as part of configuring the application, identifying sequences of applications (block 525). For example, one or more sequences of applications, of user device 210, may be identified, and information identifying the one or more sequences of applications and information identifying the applications of the one or more sequences of applications may be stored in a data structure (such as data structure 400B described above with regard to FIG. 4B). In some implementations, the sequence of applications may indicate that, directly after using one application, the user may use another application or one of two or more other applications. A sequence of applications may include applications of a same category of applications or applications of different categories of applications.

In some implementations, the user may provide the information identifying a sequence of applications and provide the information identify the applications of the sequence of applications using the one or more elements of the one or more user interfaces provided by user device 210. For example, the user may provide a name of a sequence of applications using the one or more elements. Thereafter, the user may provide a first application of the sequence of applications, a second application of the sequence of application, and so forth until the last application of the sequence of applications using the one or more elements.

In some implementations, the user may modify a sequence of applications. For example, using the one or more elements of the one or more user interfaces provided by user device 210, the user may add one or more applications to the sequence of applications, delete one or more applications from the sequence of applications, re-order the applications of the sequence, and/or delete the sequence of applications. The user may cause information identifying the modified sequence of applications, in a data structure such as data structure 400B, to be updated based on modifying the sequence of applications.

In some implementations, application navigation software 215 may automatically perform all or a portion of the acts described above with respect to identifying the sequences of applications. For example, application navigation software 215 may monitor usage of applications of user device 210 to generate application usage information and identify a sequence of applications based on the application usage information. For example, based on the application usage information, application navigation software 215 may identify a first instance of the user of user device 210 using particular applications in a particular sequence. After identifying that the user uses the particular applications in the particular sequence a threshold quantity of times, application navigation software 215 may suggest the particular sequence to the user. When the user accepts the suggestion, application navigation software 215 may cause information identifying the particular sequence and the applications of the particular sequence to be stored in a data structure such as, for example, data structure 400B.

In some implementations, the particular sequence may be suggested as a new sequence. In some implementations, the particular sequence may be suggested as an update to an existing sequence. In some implementations, based on the application usage information generated based on monitoring the usage of applications of user device 210, application navigation software 215 may periodically identify and suggest one or more sequences of applications. For example, application navigation software 215 may identify and suggest one or more sequences of applications on a weekly basis, a biweekly basis, a monthly basis, etc. Additionally, or alternatively, application navigation software 215 may identify and suggest one or more sequences of applications each time a new application is downloaded to user device 215, each time an application is removed from user device 215, and/or the like. In some implementations, as part of suggesting sequences of applications, application navigation software 215 may provide, to the user, information identifying the sequences of applications, information indicating whether the suggested sequences of applications are new sequences or modifications to existing sequences, information identifying a basis of the suggestions (e.g., weekly, monthly, etc.), an/or the like. In some implementations, the user may configure the frequency of application navigation software 215 identifying and suggesting the one or more sequences of applications.

Process 500 may include, as part of configuring the application, identifying events related to applications (block 530). For example, one or more events and one or more applications (e.g., a sequence of applications), of user device 210, associated with the one or more events may be identified. The information identifying the one or more events and the information identifying the one or more applications may be stored in a data structure, such as data structure 400C described above with regard to FIG. 4C.

In some implementations, the user may provide the information identifying an event using the one or more elements of the one or more user interfaces provided by user device 210. For example, the user may provide information identifying a calendar event as an event. The information identifying the calendar event may include, for example, a day (or a range of days), a date (or a range of dates), a time (or a range of times), a month (or a range of months), a year (or a range of years), a location, a timer, and/or the like. For example, the user may set a timer whereby an expiration of the timer may cause an application to be initiated and/or may cause a sequence of applications (that may include the application) to be provided. The calendar event may occur one time (such as, for example, a particular meeting, a sporting event, etc.) or may be a re-occurring calendar event (such as, for example, a birthday, an anniversary, etc). In some implementations, the user may provide the calendar event using a calendar functionality of application navigation software 215. In some implementations, the user may provide the calendar event using a calendar application that is separate from application navigation software 215. Additionally, or alternatively, the user may provide information identifying a location and/or a time.

Additionally, or alternatively, the user may provide information identifying a gesture. As explained above, the information identifying the gesture may include, for example, information identifying a type of the gesture, information identifying a direction of the gesture, information identifying a speed of the gesture, and/or the like. For example, one gesture may cause a next application in a sequence of applications to start and/or the sequence of applications to be provided, another gesture may cause a previous application in the sequence of applications to start and/or the sequence of applications to be provided, etc. Additionally, or alternatively, the user may provide information identifying a command. As explained above, the information identifying the command may include information identifying a type of the command and the command. For example, the voice command may include "bring up related sequence of applications," "start next application," "start previous application," "only show applications of a category Sports in the sequence of applications," and/or the like. Additionally, or alternatively, the user may provide information identifying a notification as an event. The information identifying the notification may include information identifying a source of the notification (such as, for example, a particular user, a particular entity associated with one or more applications of user device 210, etc.) and/or information identifying a type or content of the notification.

In some implementations, the user may provide the information identify one or more applications associated with the event using the one or more elements of the one or more user interfaces provided by user device 210. For example, the user may provide a particular application of user device 210 or a particular sequence of applications to be associated with a particular period of time (e.g., Weekdays at 6 PM) thereby causing the particular application to be initiated and/or causing the particular sequence of applications (that may include the particular application) to be provided as a suggestion to the user during the particular period time. Additionally, the user may provide one or more applications (e.g., a sequence of applications) of user device 210 to be associated with a particular notification or a particular source of notifications thereby causing the one or more applications to be provided as suggestions to the user when the particular notification is received or when notifications from the particular source are received. Additionally, the user may provide one or more applications (e.g., a sequence of applications) of user device 210 to be associated with a location and/or a time thereby causing the one or more applications to be provided as suggestions to the user when user device 210 is located at (or within a particular distance of) the location and/or when a current time corresponds to the time. For example, the user may provide a sequence of applications to be associated with a work location of the user and/or with a typical time at which the user arrives at work (e.g., 8:45 AM).

In some implementations, application navigation software 215 may automatically perform all or a portion of the acts described above with respect to identifying events related to applications. For example, based on the application usage information (generated based on monitoring the usage of applications of user device 210) and based on a particular event, application navigation software 215 may determine that, when the particular even occurs, the user uses one or more particular applications. Additionally, or alternatively, application navigation software 215 may determine that the user uses the one or more particular applications in a particular sequence (e.g., the user first uses a first particular application, followed by a second particular application, and so forth). After identifying a threshold quantity of times that the user uses the one or more particular applications when the particular event occurs and/or uses the one or more particular applications in the particular sequence when the particular event occurs, application navigation software 215 may suggest the particular event, the one or more particular applications, and/or the particular sequence to the user. When the user accepts the suggestion, application navigation software 215 may cause information identifying the particular event, the particular sequence, the particular applications, and/or the particular sequence to be stored in a data structure such as, for example, data structure 400C.

In some implementations, application navigation software 215 may monitor the user's usage of applications of user device 210 to identify an event related to user actions with respect to an application. For example, application navigation software 215 may monitor the user's usage of applications of user device 210 to identify an event relating to a user closing an application after using the application (or application closing event). By way of example, based on the application usage information generated by monitoring the user's usage of applications of user device 210, application navigation software 215 may identify information (e.g., application closing information) indicative of the user nearing an ending of using a particular application, thereby indicating that the user will be closing a particular application.

The application closing information may include, for example, an amount of time (or an average amount of time) the user spends accessing the particular application, a typical time and/or a typical date at which the user typically accesses different applications, a pattern of user actions with the particular application, etc. The pattern of user actions may include the user selecting an element of user device 210 or an element of the particular application to close the particular application; the user closing the particular application after a scroll down operation (e.g., scrolling to or toward a bottom portion of the particular application) and a scroll up operation (e.g., scrolling to or toward a top portion of the particular application); the user closing the particular application after selecting one or more elements (or portions) of the particular application; the user closing the particular application after reaching a particular section of an interface or a document associated with the particular application. After identifying a pattern of user actions with respect to the application (e.g., that the user action occurred a threshold quantity of times and was immediately followed by a closing of the application), application navigation software 215 may associate the application closing event with a sequence of applications that includes the particular application, thereby causing the sequence of applications to be presented to the user when the application closing event is detected. The sequence of applications may include one or more applications preceding and/or following the particular application in an order of usage by the user.

Process 500 may include storing the configuration information generated based on configuring the application (block 535). For example, the configuration information may be stored in one or more data structures associated with user device 210, such as data structure 400A, data structure 400B, data structure 400C described above with regard to FIGS. 4A-4C. In some implementations, the configuration information may be transmitted to one or more other user devices (onto which application navigation software 215 has been downloaded) associated with a user of user device 210 to configure application navigation software 215 of the one or more other user devices. For example, the configuration information may be used to automatically configure application navigation software 215 of the one or more other user devices. In some implementations, user device 210 may receive, from another user device associated with the user, the configuration information generated by configuring application navigation software 215 on the other device. By way of example, the configuration information, received from the other user device, may be combined with the configuration information of user device 210 to further configure application navigation software 215 of user device 210. In some implementations, application navigation software 215 when identifies a conflict of configuration application navigation software 215 relative to the configuration information, application navigation software 215 may provide information identifying the conflict to the user and receive input from the user to resolve the conflict. In some implementations, application navigation software 215 may automatically resolve the conflict based on application usage information.

In some implementations, the configuration information may be generated for each user of a plurality of users of user device 210 and may be stored in data structures (similar to data structure 400A, data structure 400B, and/or data structure 400C) that are associated with each user. For example, application navigation software 215 may enable each user to create an account that may accessed using a username and/or a password unique to each user, log into the account using the username and/or password, and configure application navigation software 215 to generate configuration information that may be stored in one or more data structures.

While a series of blocks has been described with regard to FIG. 5, the blocks and/or the order of the blocks may be modified in some implementations. Additionally, or alternatively, non-dependent blocks may be performed in parallel. Furthermore, one or more blocks may be omitted in some implementations.

FIGS. 6A-6E are diagrams of an example 600 of process 500 described above with respect to FIG. 5. In example 600, assume a user has downloaded application navigation software 215 and has initiated application navigation software 215.

As shown in relation to FIG. 6A, application navigation software 215 may cause user device 210 to provide a user interface that may allow the user to identify a new category of applications or identify an existing category of applications. For example, as shown in relation to FIG. 6A, the user has identified a new category of applications as News. Once the user has identified the category of applications, the user interface may allow the user to select a "NEXT" option to identify applications to be associated with the News category.

Figure 6B:
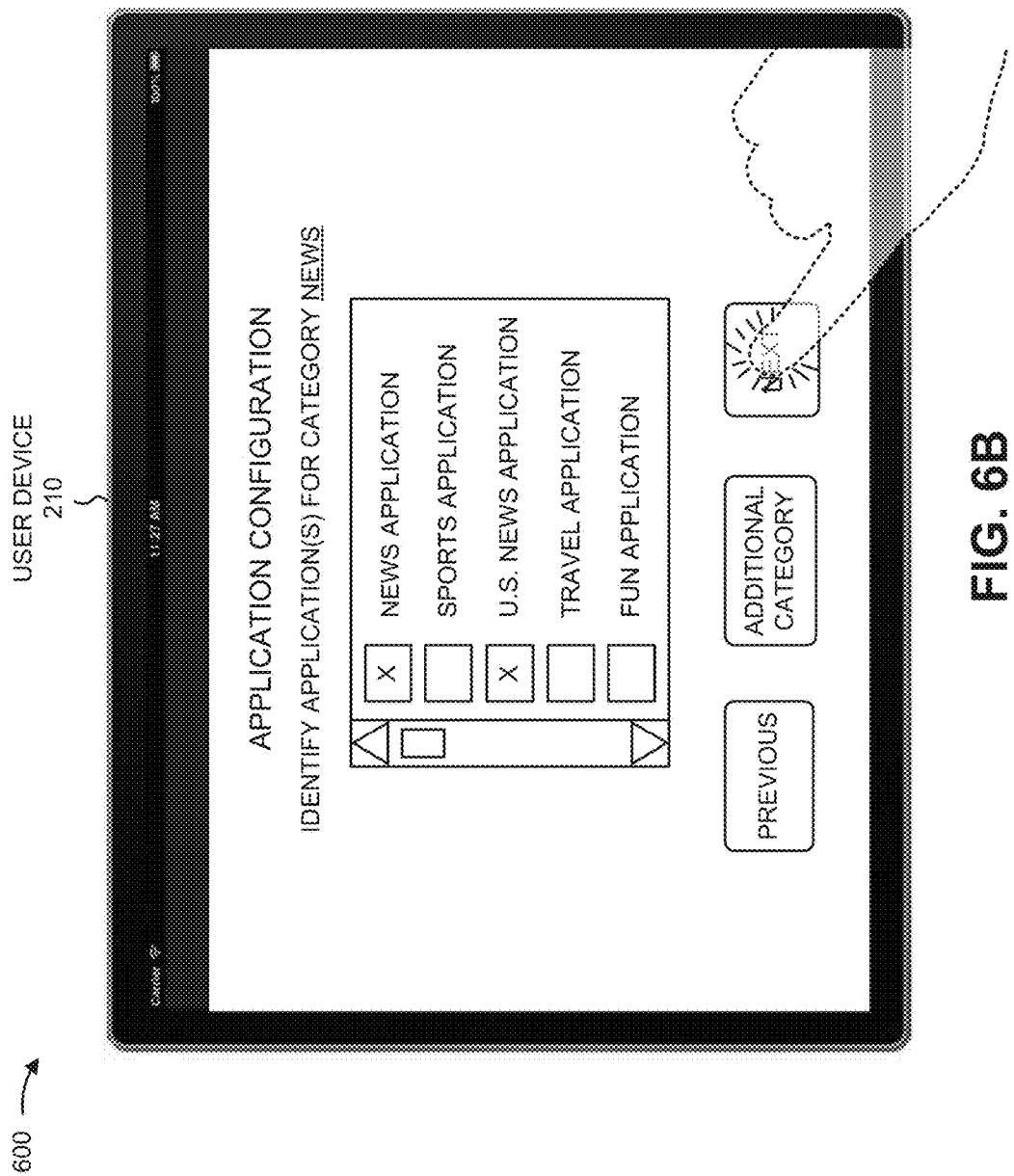

As shown in relation to FIG. 6B, application navigation software 215 may cause user device 210 to provide a user interface that may allow the user to identify applications that are to be associated with a category of applications. For example, as shown in relation to FIG. 6B, the user has identified, from the applications of user device 210, News App and U.S. News App as applications to be associated with the News category. Once the user has identified the applications to be associated with a category of applications, the user interface may allow the user to select a "ADDITIONAL CATEGORY" option to enable to the user to repeat the process for another category of applications (e.g., identifying another new category or modify an existing category) or may allow the user to select a "NEXT" option to identify a sequence of applications.

Figure 6C:
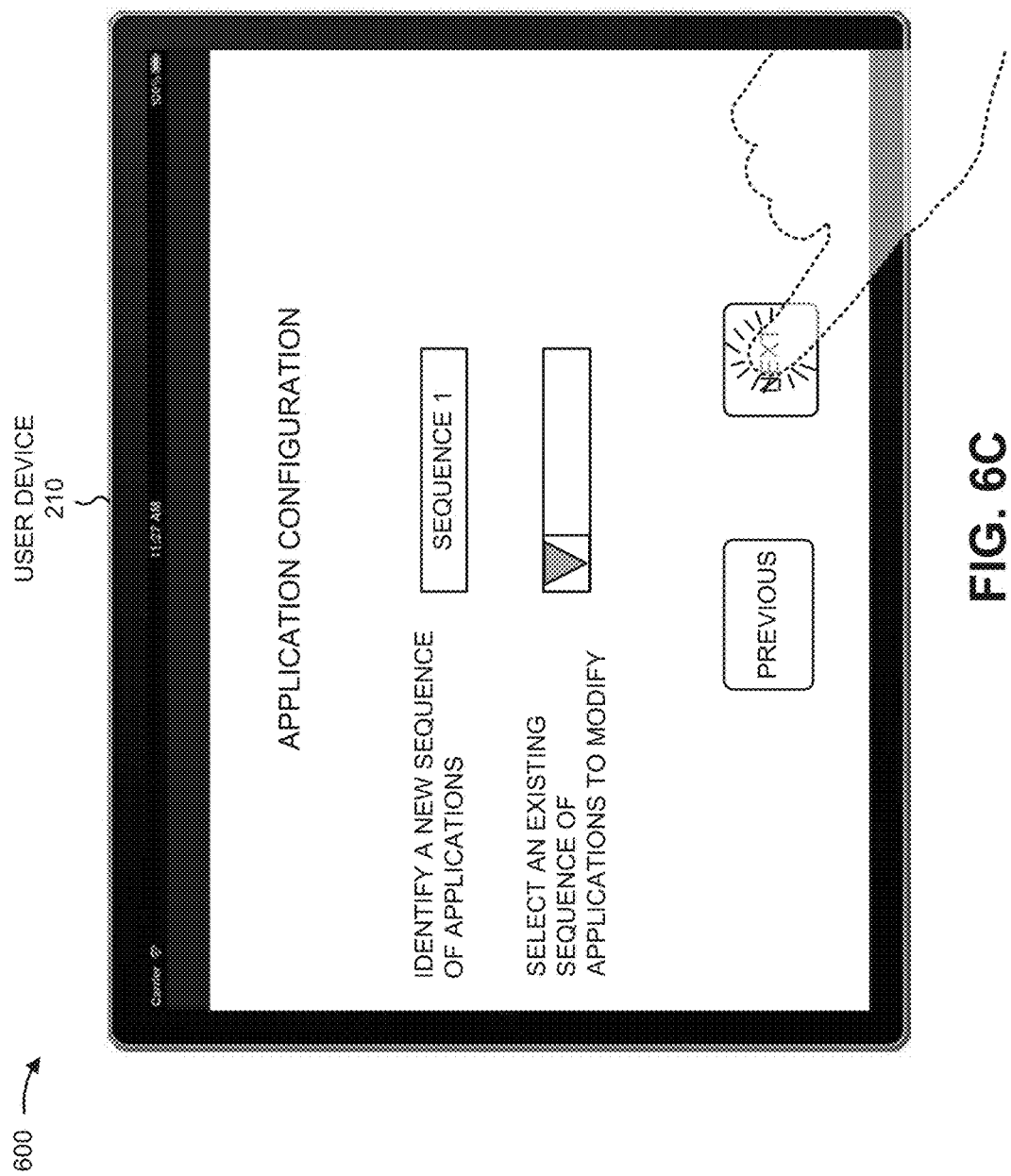

As shown in relation to FIG. 6C, application navigation software 215 may cause user device 210 to provide a user interface that may allow the user to identify a new sequence of applications or identify an existing sequence of applications. For example, as shown in relation to FIG. 6C, the user has identified a new sequence of applications as Sequence 1 which may correspond to a sequence of applications that the user typically uses in the morning. Once the user has identified the sequence of applications, the user interface may allow the user to select a "NEXT" option to identify applications to be associated with a sequence of applications.

As shown in relation to FIG. 6D, application navigation software 215 may cause user device 210 to provide a user interface that may allow the user to identify applications that are to be associated with a sequence of applications. For example, the user may select graphical information (e.g., icons) of applications and arrange the selected icons in a sequence of usage of the applications corresponding to the selected icons. By way of example, in example 600, assume the user typically uses News App, followed by Sports App, followed by Pro Basketball App. As shown in relation to FIG. 6D, the user has identified, from the applications of user device 210, a sequence that identifies News App, followed by Sports App, followed by Pro Basketball App. The sequence of News App, followed by Sports App, followed by Pro Basketball App may be identified, for example, by drag-and-drop operations of the icons corresponding to News App, Sports App, and Pro Basketball App. Once the user has identified the applications to be associated with a sequence of applications, the user interface may allow the user to select an "ADDITIONAL SEQUENCE" option to enable to the user to repeat the process for another sequence of applications (e.g., identifying another new sequence or modify an existing sequence), may allow the user to select a "NEXT" option to associate applications with events, or may allow the user to select a "DONE" option to terminate the configuration of application navigation software 215.

Figure 6E:
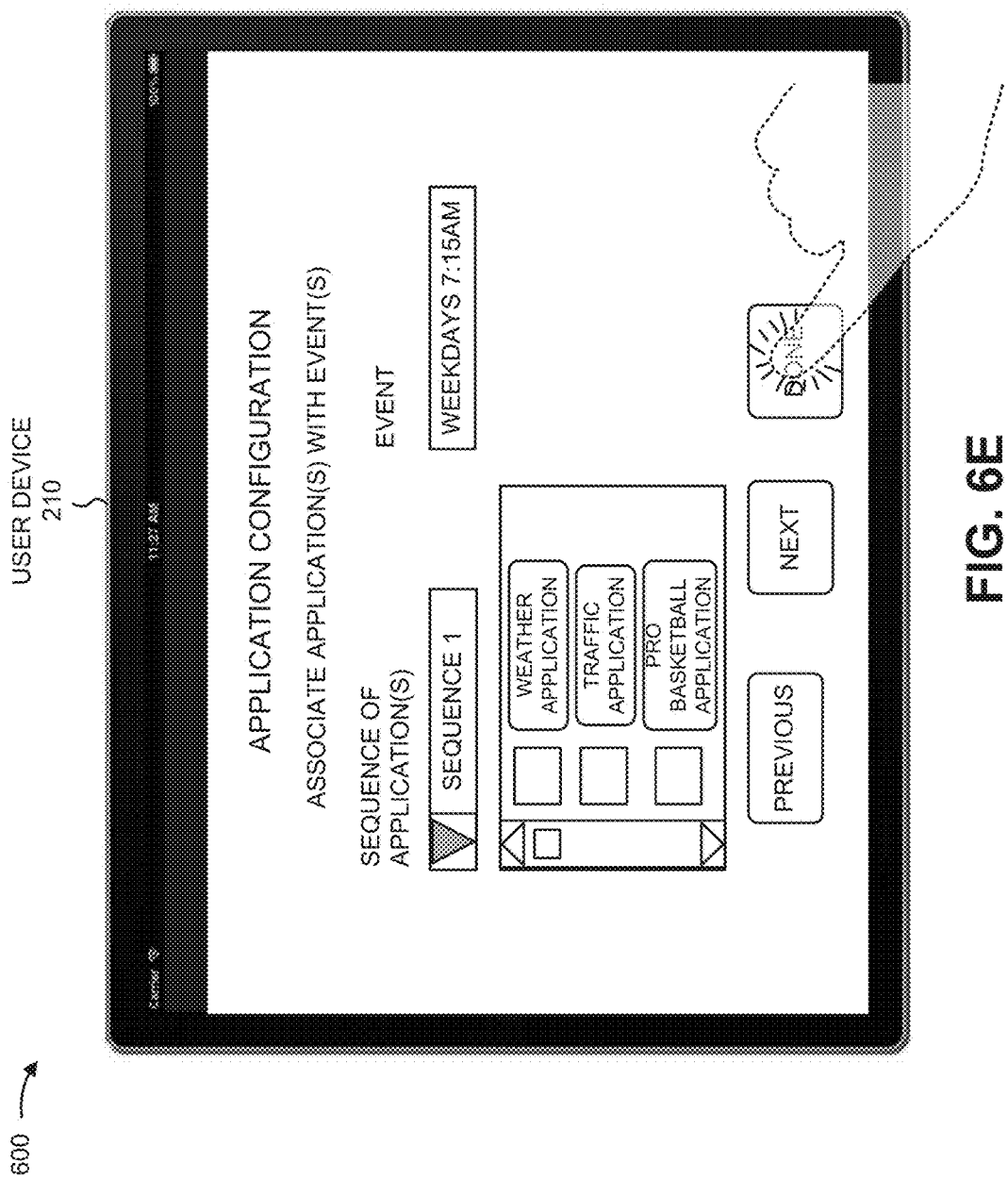

As shown in relation to FIG. 6E, application navigation software 215 may cause user device 210 to provide a user interface that may allow the user to identify a sequence of applications or one or more applications that are to be associated with an event. For example, the user may identify a sequence of application using a drop down menu element, identify one or more applications using text input elements provided next to icons identifying the applications, and identify an event using a text input element. The user may provide an order of each application using the text input elements provided next to the icons. As shown in relation to FIG. 6E, the user has identified the Sequence 1 sequence and has identified an event as Weekdays 7:15 AM. Accordingly, each weekday, at 7:15 AM, the applications of Sequence 1 may be provided as a suggestion to the user. Once the user has identified an event and the applications to be associated with the event, the user interface may allow the user to select an "ADDITIONAL SEQUENCE" option to enable to the user to repeat the process for another event (e.g., identifying another new event or modify an existing event) or may allow the user to select a "DONE" option to terminate the configuration of application navigation software 215.

The number of elements of the user interfaces shown in FIGS. 6A-6E is provided for explanatory purposes. In practice, the user interfaces may include additional elements, fewer elements, different elements, or differently arranged elements than those shown in FIGS. 6A-6E.

FIG. 7 is a flowchart of an example process 700 for navigating between applications. In some implementations, process 700 may be performed by user device 210. In some implementations, one or more blocks of process 700 may be performed by one or more devices instead of, or possibly in conjunction with, user device 210.

Process 700 may include initiating application navigation software 215 (block 705). For example, a user, of user device 210, may select information identifying application navigation software 215 (e.g., an icon of application navigation software 215) on a user interface provided by user device 210. By way of example, selection of the information identifying application navigation software 215 may cause user device 210 to initiate application navigation software 215. In some implementations, application navigation software 215 may run in a background process while the user continues to use user device 210. For example, application navigation software 215 may run in a background process while the user uses another application of user device 210. In some implementations, user device 210 may initiate application navigation software 215 based on an event, such as user device 210 being powered on.

In some implementations, the user may log into an account, of application navigation software 215, associated with the user thereby causing application navigation software 215 to select the configuration information associated with the user from among configuration information associated with one or more other users of user device 210.

Process 700 may include detecting an event (block 710). For example, application navigation software 215 may detect an event. By way of example, application navigation software 215 may detect an event while a user of user device 210 is using an application of user device 210. Additionally, or alternatively, application navigation software 215 may detect an event while the user is not using any application of user device 210 while user device 210 is powered on. For example, user device 210 may be in a stand-by mode.

In some implementations, application navigation software 215 may detect an application closing event. For example, application navigation software 215 may detect the application closing event by detecting that the user has selected an element of an application, being used by the user, to close the application or by detecting that the user has selected an element (e.g., a button) of user device 210 to close the application or navigate away from the application. Additionally, or alternatively, application navigation software 215 may detect a voice input, from the user, indicating that the user will be closing the application. For example, application navigation software 215 may detect a voice input of "I am finishing up with using this app," "I am ready to move on to the next app," or "close app."

Additionally, or alternatively, application navigation software 215 may detect the application closing event based on the application closing information. By way of example, application navigation software 215 may detect the application closing event by comparing the amount of the time the user has spent accessing the application with an amount of time (or an average amount of time) the user typically spends accessing the particular application, by comparing a current date and/or a time to a time and/or a date at which the user typically accesses another application, by comparing a pattern of user actions with the application with a typical pattern of user actions with the application, and/or the like. By way of example, application navigation software 215 may determine whether the user has performed a scroll down operation followed by a scroll up operation, may determine whether the user has selected one or more elements (or portions) of the application, may determine whether the user has reached a particular section of an interface or a particular section of a document associated with the application, may determine whether the user has made a particular gesture in relation to the application, etc. For example, a pitching gesture or a swiping gesture to the left may cause a next application, following the application in the sequence of applications, to be initiated and/or may cause the sequence of applications to be provided. Additionally, or alternatively, a swiping gesture to the right may cause a previous application, preceding the application in the sequence of applications, to be initiated and/or may cause the sequence of applications to be provided. In some implementations, the speed of the gesture may cause the next application or the following application to be initiated immediately (fast swipe) or to be initiated in a delayed fashion (slow swipe). For example, the slow swipe may cause a timer to be set and the next application or the following application may be initiated after an expiration of the timer.

In some implementations, application navigation software 215 may detect a calendar event. For example, application navigation software 215 may capture a current time, a current day, a current date, and/or a location associated with the calendar event. Additionally, or alternatively, application navigation software 215 may detect a reminder for the calendar event. By way of example, the reminder may include information identifying a date, a time, a day, and/or other information describing the calendar event such as, for example, a title of the calendar event, a location associated with calendar event, one or more individuals associated with the calendar event, and/or the like. In some implementations, application navigation software 215 may detect a location of user device 210 and/or a current time.

In some implementations, application navigation software 215 may detect user device 210 receiving a notification as an event. For example, application navigation software 215 may detect that user device has received an e-mail, a text message, a notification associated with a social network, a message from an entity associated with an application of user device 210, and/or the like.

Process 700 may include identifying one or more applications related to the event (block 710). For example, application navigation software 215 may identify one or more applications that are related to the event. The one or more applications may correspond to one or more sequences of applications. In some implementations, application navigation software 215 may search a data structure, associated with user device 210, using information identifying the event to identify information identifying one or more applications that are associated with the event. In some implementations, the information identifying the event may be stored, in the data structure, with information identifying a single application, with information identifying a group of applications, with information identifying a particular category of applications, with information identifying a particular sequence of applications, and/or the like.

For example, application navigation software 215 may search data structure 400C for information identifying an application closing event of a particular application and may identify information identifying one or more applications or a particular sequence of applications associated with the application closing event of the particular application. Additionally, or alternatively, application navigation software 215 may search data structure 400C for information identifying a date and/or a time corresponding to a captured current date and/or time and may identify information identifying one or more applications or a particular sequence of applications associated with the current date and/or time. By way of example, application navigation software 215 may identify a particular application associated with the current date and/or time and may identify a sequence of applications that includes the particular application. Additionally, or alternatively, application navigation software 215 may search data structure 400C for information identifying a calendar event and may identify information identifying one or more applications or a particular sequence of applications associated with the calendar event. Additionally, or alternatively, application navigation software 215 may search data structure 400C for information identifying a notification and may identify information identifying one or more applications or a particular sequence of applications associated with the notification.

Additionally, or alternatively, application navigation software 215 may search one or more data structures using the information identifying the event. By way of example, application navigation software 215 may search data structure 400A and/or data structure 400B for information identifying one or more applications using the information identifying the notification or the information identifying the calendar event. For example, based on detecting a calendar event identifying a wedding anniversary, application navigation software 215 may search data structure 400A and/or data structure 400B using one or a combination of the terms "wedding" and "anniversary" to identify applications (related to one or a combination of "wedding" and "anniversary") such as, for example, a flower shop application, a jewelry store application, a restaurant application, and/or the like. By way of example, the flower shop application, the jewelry store application, and the restaurant application may be identified in the data structures based on, for example, metadata of the applications, name of the applications, and/or other information that describes the applications in data structure 400A and/or data structure 400B.

In some implementations, application navigation software 215 may identify one or more applications related to the event based on the application usage information. For example, based on the application usage information, application navigation software 215 may determine that, when the event is detected, the user typically uses a particular application. Additionally, or alternatively, based on the application usage information, application navigation software 215 may determine that the user typically uses particular applications in a particular sequence (e.g., the user first uses a first particular application, followed by a second particular application, and so forth).

Process 700 may include presenting information identifying the identified applications (block 715). For example, application navigation software 215 may cause user device 210 to present icons identifying the identified applications. The identified applications may correspond to applications of a same category, may correspond to applications of different categories, may correspond to one or more sequences of applications, and/or the like. By way of example, each sequence of applications may be associated with a same category of applications and/or different categories of applications. In some implementations, each icon may be associated with a color identifying a respective category of applications. In some implementations, each category of applications may be associated with a different color.

In some implementations, application navigation software 215 may cause the information identifying the identified applications to be presented with the application being used by the user. In some implementations, application navigation software 215 may cause the information identifying the identified applications to be presented after the user has closed the application being used by the user when the event was detected. In some implementations, application navigation software 215 may cause one of the identified applications to be initiated without detecting selection of the information identifying the application. For example, application navigation software 215 may cause an identified application, associated with a particular date and/or time, to be automatically initiated at a date and/or time corresponding to the particular date and/or time. In some implementations, information identifying one or more additional applications may also be presented to the user.

In some implementations, application navigation software 215 may determine that the identified applications are associated with a particular sequence of applications and may cause the identified applications to be presented in the particular sequence of applications. For example, application navigation software 215 may cause user device 210 to present icons identifying the identified applications in the particular sequence of applications. In some implementations, the icon identifying a next application (or previous application) in the particular sequence of applications may be visually distinguished from the icons identifying the identified applications. For example, application navigation software 215 may cause the icon to be highlighted, to blink, etc. Additionally, or alternatively, when the application being used by the user is included in the particular sequence of applications, the icon identifying the application being used by the user may also be visually distinguished from the icons identifying the identified applications and in a manner that is different than a manner in which the icon identifying the next application has been visually distinguished. In some implementations, application navigation software 215 may determine that the identified applications are not associated with a particular sequence. Accordingly, for example, application navigation software 215 may cause the identified applications to be presented, based on the application usage information, in an order of frequency of usage, in an order of recency of usage, and/or the like. Additionally, or alternatively, application navigation software 215 may cause the identified applications to be presented in an order of relevancy to the event. By way of example, based on detecting that user device 210 has received a notification about a new record in women's professional basketball, application navigation software 215 may identify a sports application, a basketball application, a professional women's basketball application, and a news application. In this instance, application navigation software 215 may cause user device 210 to present an icon for the professional women's basketball application (the most relevant application to the notification), followed by an icon for the basketball application, followed by an icon for the sports application, and followed by an icon for the news application. In some implementations, the user of user device 210 may identify a preference with respect to an order of frequency of usage, a preference with respect to an order of recency of usage, a preference with respect to an order of relevancy, and/or the like.

Process 700 may include detecting selection of information identifying an identified application (block 725). For example, application navigation software 215 may detect selection of an icon identifying the identified application via a touch screen display of user device 210, a keyboard of user device 210, a keypad of user device 210, a mouse of user device 210, a button of user device 210, and/or the like. Additionally, or alternatively, application navigation software 215 may detect a voice input of the user indicating selection of the identified application via a microphone of user device 210.

Process 700 may include initiated the identified application (block 730). For example, application navigation software 215 may cause the identified application to be initiated based on detecting the selection of the information identifying the application. By way of example, application navigation software 215 may cause user device 210 to present the identified application to the user.

While a series of blocks has been described with regard to FIG. 7, the blocks and/or the order of the blocks may be modified in some implementations. Additionally, or alternatively, non-dependent blocks may be performed in parallel. Furthermore, one or more blocks may be omitted in some implementations.

FIGS. 8A-8D are diagrams of an example 800 of process 700 described above with respect to FIG. 7. In example 800, assume a user has initiated application navigation software 215. Further assume the user is in the process of using an application, such as news application. Additionally, assume application navigation software 215 has detected a reminder for a calendar event for Taja-Mya's birthday at Celebration Park. Application navigation software 215 may identify applications that are related to Taja-Mya's birthday based on detecting the calendar reminder for Taja-Mya's birthday.

For example, application navigation software 215 may search a data structure, using the content of the reminder, for applications related to Taja-Mya's birthday. By way of example, application navigation software 215 may search data structure 400A, data structure 400B, and/or data structure 400C using "birthday," "park," and/or "Taja-Mya" as keywords. Application navigation software 215 may identify a gift store application that may enable a user of user device 210 to purchase gifts for Taja-Mya, a traffic application that may enable the user to identify the amount of traffic and directions from the user's current location to the birthday location (i.e., Celebration Park), and a cake store application that may enable the user to purchase a birthday cake for Taja-Mya. The gift store application, the traffic application, and the cake store application may be identified based on the metadata and other information associated with the applications.

Figure 8A:
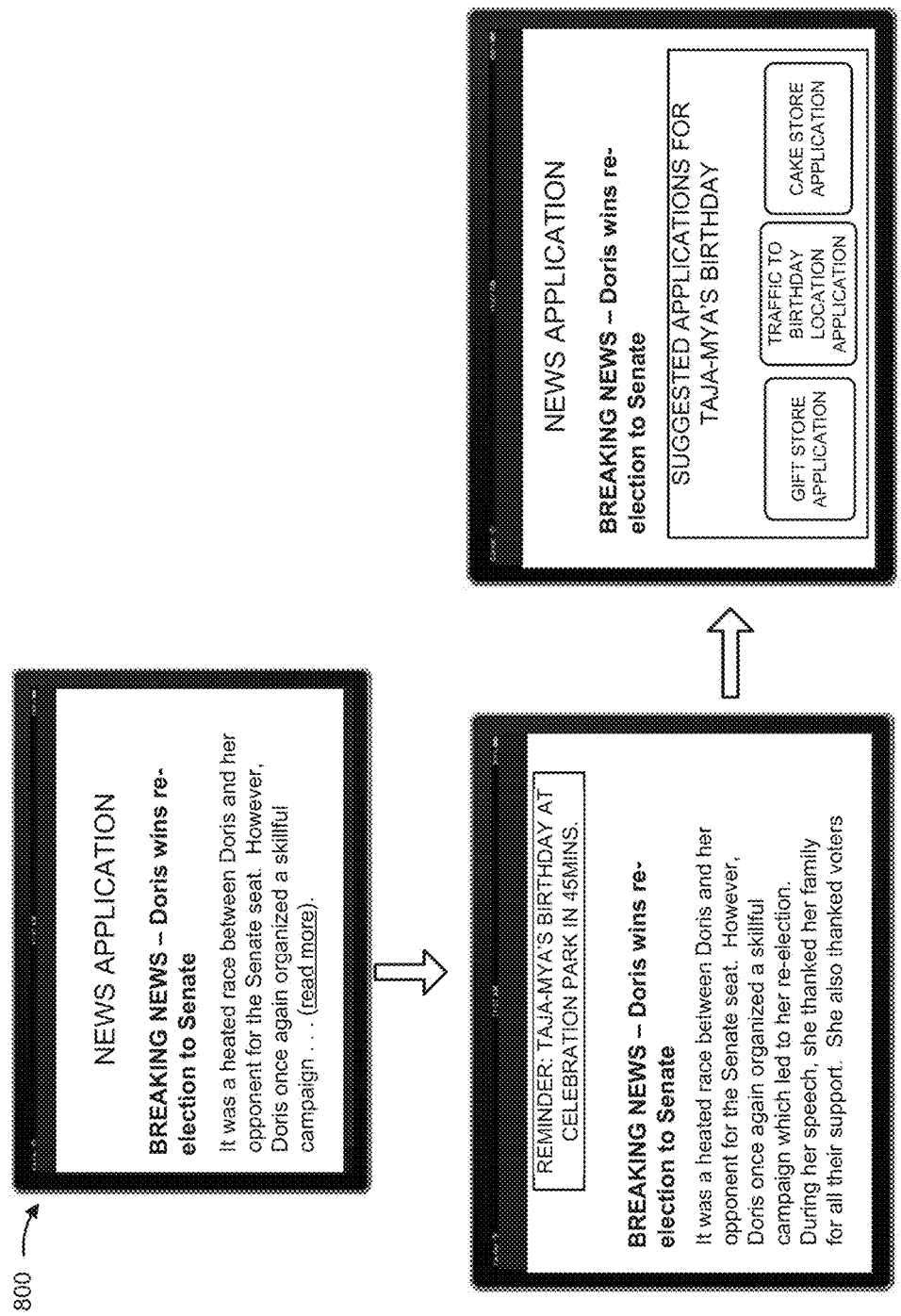

As shown in relation to FIG. 8A, application navigation software 215 may cause user device 210 to provide, to the user, information identifying the gift store application, the traffic application, and the cake store application. For example, application navigation software 215 may cause user device 210 to provide, to the user, icons identifying the gift store application, the traffic application, and the cake store application. The icons may be presented in an order of relevancy with respect to the reminder for a calendar event, an order of frequency of use, an order of recency of use, etc.

Figure 8B:
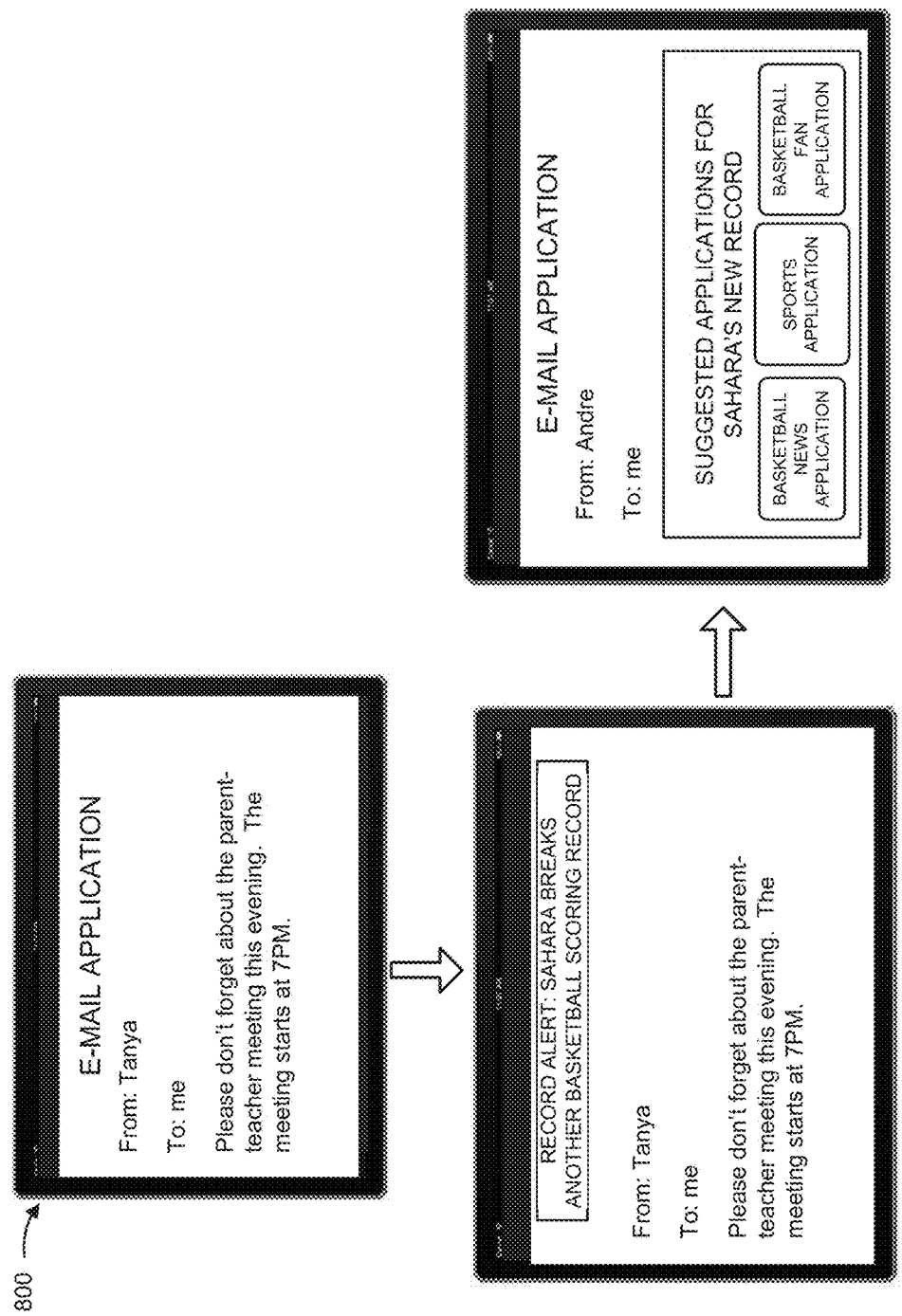

As shown in relation to FIG. 8B, assume a user of user device 210 has initiated application navigation software 215. Further assume the user is in the process of using an application such as a gaming application. Additionally, assume application navigation software 215 has detected that user device 210 has received a notification (e.g., a push notification) indicating that Sahara, a famous professional basketball player, has broken another basketball scoring record. Application navigation software 215 may identify applications that are related to the notification based on detecting that user device 210 has received the notification regarding Sahara breaking another basketball scoring record.

For example, application navigation software 215 may search data structures, using the content of the reminder, for applications related to the notification. By way of example, application navigation software 215 may search data structure 400A, data structure 400B, and/or data structure 400C using "basketball," "scoring," "record," and/or "Sahara" as keywords and may identify applications whose metadata and other information match the keywords. For example, application navigation software 215 may identify a basketball news application that may provide information regarding basketball to a user of user device 210, a sports application that may provide information regarding sports including basketball, and a basketball application that may provide information regarding basketball for basketball fans. As shown in relation to FIG. 8B, application navigation software 215 may cause user device 210 to provide, to the user, icons for the basketball news application, the sports application, and the basketball fan application. The icons may be presented in an order of relevancy with respect to the notification, an order of frequency of use of the applications, an order of recency of use of the applications, etc.

Figure 8C:
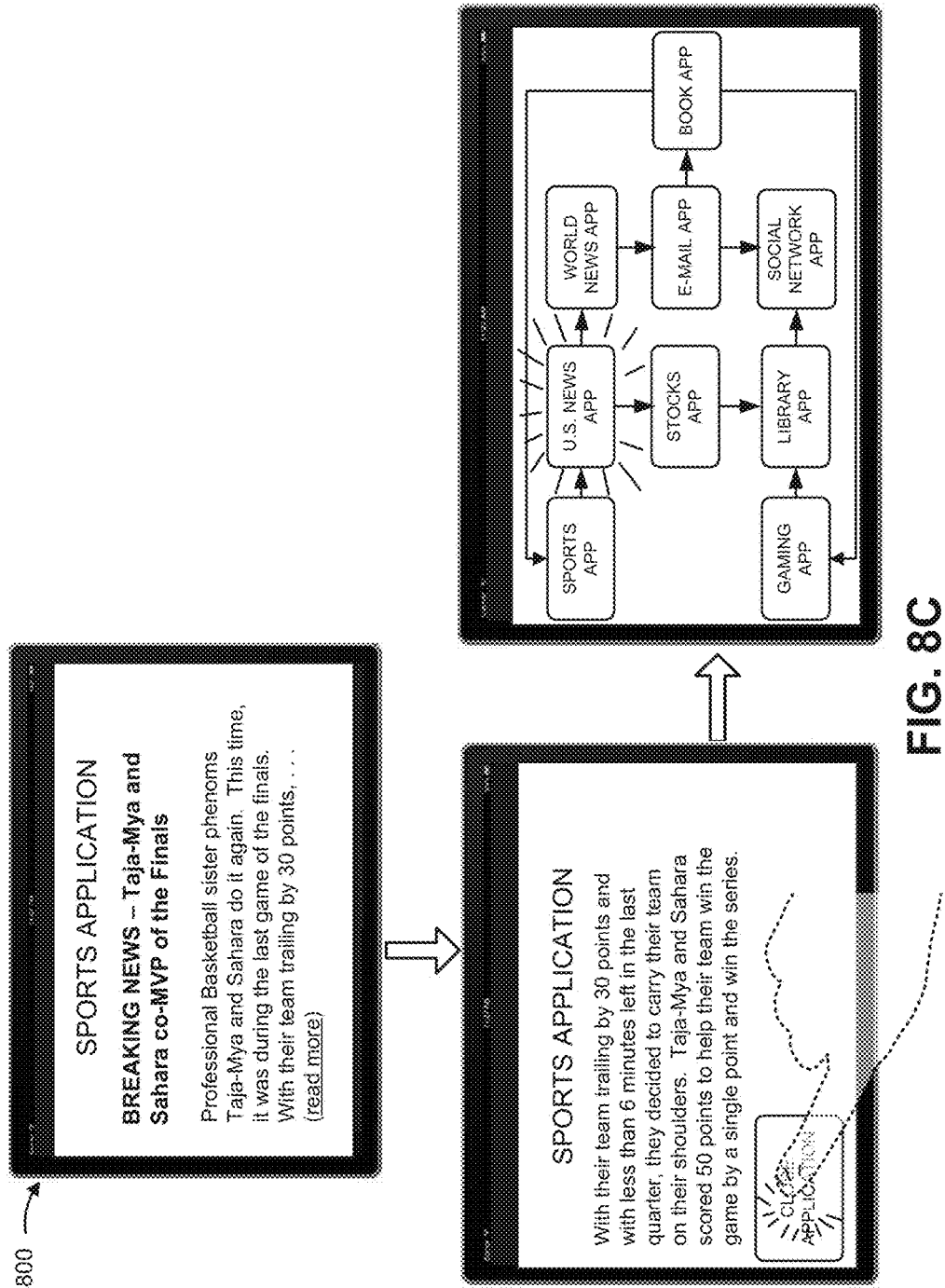

As shown in relation to FIG. 8C, assume a user of user device 210 has initiated application navigation software 215. Additionally, assume the user has identified a sequence of applications and that the sequence of applications indicates that the user first uses a Sports application, followed by a U.S. News application, which may be followed by a World News application or a Stocks application, and so forth, as shown in relation to FIG. 8C. Further, assume the user is in the process of using the Sports application. As shown in relation to FIG. 8C, the user decides to close the Sports application. Assume application navigation software 215 has detected a closing of the Sports application. Application navigation software 215 may identify the sequence of applications based on detecting the closing of the Sports application.

For example, application navigation software 215 may search one or more data structures and identify the sequence of applications related to the closing of the Sports application. By way of example, application navigation software 215 may search data structure 400A, data structure 400B, and/or data structure 400C using information related to the closing of the Sports application. For example, application navigation software 215 may identify the sequence of applications shown in relation to FIG. 8C. As shown in relation to FIG. 8C, application navigation software 215 may cause user device 210 to provide, to the user, icons of the applications of the sequence of applications identified by application navigation software 215. As shown in relation to FIG. 8C, application navigation software 215 may also cause a next application (i.e., the U.S. News application), following the Sports application in the sequence of applications, to be visually distinguished from the other applications in the sequence of applications. The U.S. News application may be initiated based on the user selecting the icon of the U.S. News application or based on a voice command of the user to initiate the U.S. News application. Additionally, or alternatively, the U.S. News application may be automatically initiated when a particular period of time expires after the sequence of applications has been provided to the user (e.g., after expiration of a timer associated with providing the sequence of applications to the user).

As shown in relation to FIG. 8D, assume a user of user device 210 has initiated application navigation software 215. Additionally, assume the user has identified a sequence of applications. Further assume the sequence of applications indicates that the user first uses a News application, followed by a World News application, which may be followed by a Book application or a Stocks application and that following the Book application, and the sequence of applications indicates that the user uses an E-mail application, followed by a Gaming application, followed by the News application. Further, assume user device 210 has provided an interface that includes icons of applications of user device 210. As shown in relation to FIG. 8D, the user may select the icon identifying the News application. The News application may be initiated. Assume application navigation software 215 has detected the selection of the icon identifying the News application and/or detected that the News application has been initiated. Application navigation software 215 may identify the sequence of applications based on the selection of the icon identifying the News application and/or based on detecting that the News application has been initiated.

For example, application navigation software 215 may search one or more data structures and identify the sequence of applications related to detecting the selection of the icon identifying the News application and/or related to detecting that the News application has been initiated. By way of example, application navigation software 215 may search data structure 400A, data structure 400B, and/or data structure 400C using information related to detecting the selection of the icon identifying the News application and/or detecting that the News application has been initiated. For example, application navigation software 215 may identify the sequence of applications shown in relation to FIG. 8D. As shown in relation to FIG. 8D, application navigation software 215 may cause user device 210 to provide, to the user, icons of the applications of the sequence of applications identified by application navigation software 215. As shown in relation to FIG. 8D, application navigation software 215 may also cause a next application (i.e., the World application), following the News application in the sequence of applications, to be visually distinguished from the other applications in the sequence of applications.

As indicated above, FIGS. 8A-8D are provided merely as examples. Other examples are possible and may differ from what was described with regard to FIGS. 8A-8D.

The foregoing disclosure provides illustration and description, but is not intended to be exhaustive or to limit the embodiments to the precise form disclosed. Modifications and variations are possible in light of the above disclosure or may be acquired from practice of the embodiments.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A device comprising:
   a memory to store instructions;
   one or more processors to execute the instructions to:
   determine that a first particular sequence of applications is used in a particular order a threshold quantity of times when a particular event occurs,
   the first particular sequence of applications including a plurality of applications;
   store, in a data structure, first particular sequence information identifying the first particular sequence of applications;
   detect the particular event,
   the particular event being a closing event associated with a closing of a particular application of the device;
   search, based on detecting the particular event, the data structure to identify the first particular sequence information,
   sequence information, identifying a plurality of sequences of applications associated with event information identifying a plurality of different events, being stored in the data structure,
   the sequence information including the first particular sequence information;
   identify, based on searching the data structure, the first particular sequence information;
   provide, for presentation and based on identifying the first particular sequence information, a representation of the first particular sequence of applications;
   receive a selection, via a user interface, of an icon representative of another application;
   modify, based on receiving the selection of the icon, the representation of the first particular sequence of applications, via a drag-and-drop operation, to include the icon in a representation of a modified first particular sequence of applications;
   modify, based on the drag-and-drop operation, a usage sequence of the first particular sequence of applications to a usage sequence of the modified first particular sequence of applications;
   determine whether a speed of a swiping gesture satisfies a threshold speed,
   a next application, of the modified first particular sequence of applications, to be initiated immediately based on the speed of the swiping gesture satisfying the threshold speed, and
   the next application to be initiated after an expiration of a timer based on the speed of the swiping gesture not satisfying the threshold speed;
   initiate the next application based on the speed of the swiping gesture;
   detect a calendar event;
   search, based on detecting the calendar event, the data structure using one or more terms associated with the calendar event;
   identify, based on searching the data structure, second particular sequence information identifying a second particular sequence of applications; and
   provide, for presentation and based on the second particular sequence information, a representation of the second particular sequence of applications.

2. The device of claim 1, where the one or more processors are further to:
   capture at least one of a current date or a current time based on detecting the calendar event; and
   where the one or more processors, when providing, for presentation, the representation of the second particular sequence of applications, are to:
   provide, for presentation based on at least one of the current date or the current time, the representation of the second particular sequence of applications.

3. The device of claim 2, where a next particular application, of the second particular sequence of applications, is associated with at least one of the current date or the current time.

4. The device of claim 1, where the one or more processors, when providing, for presentation, the representation of the first particular sequence of applications, are to:
   provide, for presentation, icons identifying the first particular sequence information,
   the icons being interconnected, via graphical elements, to show a sequence in which each application, in the first particular sequence of applications, is used.

5. The device of claim 1, where the one or more processors, when searching, based on detecting the calendar event, the data structure, are to:
   search, based on detecting the calendar event, the data structure using at least one of:
   information identifying a particular date of the calendar event,
   information identifying a particular time of the calendar event,
   information identifying a particular day of the calendar event,
   a title of the calendar event,
   information identifying a location associated with calendar event, or information identifying one or more individuals associated with the calendar event.

6. The device of claim 1, where the device includes at least one of:
   a tablet computer,
   a smart phone,
   a laptop,
   a gaming device,
   a personal digital assistant, or
   a personal computer.

7. A method comprising:
   determining, by one or more processors of a device, that a first particular sequence of applications are used in a particular order a threshold quantity of times when a particular event occurs;
   storing, by the one or more processors and in a data structure, first particular sequence information identifying the first particular sequence of applications;
   detecting, by the one or more processors, the particular event,
      the particular event being a closing event associated with a closing of a particular application of the device,
   searching, by the one or more processors and based on detecting the particular event, the data structure to identify the first particular sequence information;
   identifying, by the one or more processors and based on searching the data structure, the first particular sequence information,
   providing, by the one or more processors for presentation and based on identifying the first particular sequence information, a representation of the first particular sequence of applications;
   receiving, by the one or more processors, a selection, via a user interface, of an icon representative of another application;
   modifying, by the one or more processors and based on receiving the selection of the icon, the representation of the first particular sequence of applications, via a drag-and-drop operation, to include the icon in a representation of a modified first particular sequence of applications;
   modifying, by the one or more processors and based on the drag-and-drop operation, a usage sequence of the first particular sequence of applications to a usage sequence of the modified first particular sequence of applications;
   determining, by the one or more processors, whether a speed of a swiping gesture satisfies a threshold speed,
      a next application, of the modified first particular sequence of applications, to be initiated immediately based on the speed of the swiping gesture satisfying the threshold speed, and
      the next application to be initiated after an expiration of a timer based on the speed of the swiping gesture not satisfying the threshold speed;
   initiating, by the one or more processors, the next application based on the speed of the swiping gesture;
   detecting, by the one or more processors, a calendar event
   searching, by the one or more processors and based on detecting the calendar event, the data structure using one or more terms associated with the calendar event;
   identifying, by the one or more processors and based on searching the data structure, second particular sequence information identifying a second particular sequence of applications; and
   providing, by the one or more processors and for presentation based on the second particular sequence information, a representation of the second particular sequence of applications.

8. The method of claim 7, where searching, based on detecting the particular event, the data structure comprises:
   searching, based on detecting the particular event, the data structure using one or more terms of the particular event as one or more search terms.

9. The method of claim 7, where the calendar event includes at least one of:
   information identifying a particular date of the calendar event,
   information identifying a particular time of the calendar event,
   information identifying a particular day of the calendar event,
   a title of the calendar event,
   information identifying a location associated with calendar event, or
   information identifying one or more individuals associated with the calendar event; and
   where providing, for presentation, the representation of the second particular sequence of applications comprises:
      providing, for presentation, the representation of the second particular sequence of applications based on at least one of:
         the information identifying the particular date of the calendar event,
         the information identifying the particular time of the calendar event,
         the information identifying the particular day of the calendar event,
         the title of the calendar event,
         the information identifying the location associated with calendar event, or
         the information identifying the one or more individuals associated with the calendar event.

10. The method of claim 7, where providing, for presentation, the representation of the first particular sequence of applications includes:
    providing, for presentation, the representation of the first particular sequence of applications such that one or more icons identifying the first particular sequence of applications are using a particular format.

11. The method of claim 10, further comprising:
    visually distinguishing an icon identifying another particular application in the representation of the first particular sequence of applications using another format that is different than the particular format.

12. The method of claim 7, where detecting the particular event includes detecting a voice command,
    the voice command indicating the closing of the particular application, and
    where providing, for presentation, the representation of the first particular sequence of applications comprises:
       providing, for presentation, a portion of the representation of the first particular sequence of applications during execution of a next particular application in the first particular sequence of applications.

13. The method of claim 7, further comprising:
    monitoring, prior to detecting the particular event, usage of the particular application and other applications to obtain application usage information that includes at least one of:

information identifying an amount of time during which the particular application is accessed, or information identifying a time at which the particular application and the other applications are accessed, and where detecting the particular event includes:

detecting the closing of the particular application based on the application usage information.

14. A non-transitory computer-readable medium storing instructions, the instructions comprising:

one or more instructions which, when executed by one or more processors of a device, cause the one or more processors to:

determine that a first particular sequence of applications are used in a particular order a threshold quantity of times when a particular event occurs;

store, in a data structure, first particular sequence information identifying the first particular sequence of applications;

detect the particular event, the particular event being a closing event associated with a closing of a particular application of the device;

search, based on detecting the particular event, the data structure to identify the first particular sequence information;

identify, based on searching the data structure, the first particular sequence information, provide, for presentation and based on identifying the first particular sequence information, a representation of the first particular sequence of applications receive a selection, via a user interface, of an icon representative of another application;

modify, based on receiving the selection of the icon, the representation of the first particular sequence of applications, via a drag-and-drop operation, to include the icon in a representation of a modified first particular sequence of applications;

modify, based on the drag-and-drop operation, a usage sequence of the first particular sequence of applications to a usage sequence of the modified first particular sequence of applications;

determine whether a speed of a swiping gesture satisfies a threshold speed, a next application, of the modified first particular sequence of applications, to be initiated immediately based on the speed of the swiping gesture satisfying the threshold speed, and the next application to be initiated after an expiration of a timer based on the speed of the swiping gesture not satisfying the threshold speed;

initiate the next application based on the speed of the swiping gesture;

detect a calendar event search, based on detecting the calendar event, the data structure using one or more terms associated with the calendar event;

identify, based on searching the data structure, second particular sequence information identifying a second particular sequence of applications; and provide, for presentation and based on the second particular sequence information, a representation of the second particular sequence of applications.

15. The non-transitory computer-readable medium of claim 14, where the one or more instructions, that cause the one or more processors to search, based on detecting the particular event, the data structure, cause the one or more processors to:

search, based on detecting the particular event, the data structure using one or more terms associated with the particular event as one or more search terms.

16. The non-transitory computer-readable medium of claim 14, where the one or more instructions, that cause the one or more processors to search, based on detecting the calendar event, the data structure, cause the one or more processors to:

search, based on detecting the calendar event, the data structure using at least one of:

information identifying a particular date of the calendar event, information identifying a particular time of the calendar event, information identifying a particular day of the calendar event, a title of the calendar event, information identifying a location associated with calendar event, or information identifying one or more individuals associated with the calendar event; and where the one or more instructions, that cause the one or more processors to identify the second particular sequence information, cause the one or more processors to:

identify the second particular sequence information based on searching the data structure using at least one of:

the information identifying the particular date of the calendar event, the information identifying the particular time of the calendar event, the information identifying the particular day of the calendar event, the title of the calendar event, the information identifying the location associated with calendar event, or the information identifying the one or more individuals associated with the calendar event.

17. The non-transitory computer-readable medium of claim 14, where the one or more instructions, when executed by the one or more processors, further cause the one or more processors to:

automatically initiate a next particular application, of the first particular sequence of applications, after expiration of a particular period of time after providing, for presentation, the representation of the first particular sequence of applications.

18. The device of claim 1, where each icon, in the representation of the first particular sequence of applications, is associated with a color identifying a respective category of applications.

19. The device of claim 1, where the one or more processors are further to:

automatically initiate a next particular application, of the second particular sequence of applications, after expiration of a particular period of time after providing, for presentation, the representation of the second particular sequence of applications.

20. The non-transitory computer-readable medium of claim 14, where the one or more instructions, when executed by the one or processors, cause the one or more processors to:

detect a particular gesture; and initiate, based on detecting the particular gesture, a previous application of the modified first particular sequence of applications.

* * * * *